United States Patent [19]

Ichihara et al.

[11] Patent Number: 5,198,853
[45] Date of Patent: Mar. 30, 1993

[54] DOCUMENT SIZE DETECTION APPARATUS

[75] Inventors: Yoshiyuki Ichihara; Hiroyuki Futami; Toshihiro Motoi; Jun Nakagawa; Noboru Koizumi; Kouichi Sawada, all of Tokyo, Japan

[73] Assignee: Konica Corporation, Tokyo, Japan

[21] Appl. No.: 788,215

[22] Filed: Nov. 5, 1991

[30] Foreign Application Priority Data

| Nov. 16, 1990 | [JP] | Japan | 2-310234 |
| Nov. 16, 1990 | [JP] | Japan | 2-310235 |
| Nov. 16, 1990 | [JP] | Japan | 2-310236 |
| Nov. 16, 1990 | [JP] | Japan | 2-310237 |

[51] Int. Cl.$^5$ .................................. G03G 21/00
[52] U.S. Cl. ........................ 355/244; 355/202; 355/203; 355/311; 358/449; 358/488
[58] Field of Search ............... 355/202, 203, 233, 311, 355/75, 244, 218; 346/108; 358/488, 449,

[56] References Cited

U.S. PATENT DOCUMENTS

| 4,630,127 | 12/1986 | Fuwa | 358/449 |
| 4,672,461 | 6/1987 | Yoshida | 358/453 |
| 4,922,350 | 5/1990 | Rombola et al. | 358/488 |

FOREIGN PATENT DOCUMENTS

| 54-83438 | 7/1979 | Japan . | |
| 0041362 | 3/1985 | Japan | 358/449 |
| 0194868 | 10/1985 | Japan | 358/488 |
| 1-2263 | 1/1989 | Japan . | |

Primary Examiner—A. T. Grimley
Assistant Examiner—J. E. Barlow, Jr.
Attorney, Agent, or Firm—Frishauf, Holtz, Goodman & Woodward

[57] ABSTRACT

A document size detector for detecting a size of a document in use with a document scanner. The document size detector has an irradiator to irradiate the document with a light beam; a cover of the document; a receiver of the reflection light from the document and the cover; a converter to convert the reflection light to image signals; a detector to detect the shadow of the document on the cover in the image signals; and the determiner to determine the size of the document according to the detected shadow of the document.

10 Claims, 20 Drawing Sheets

FIG. 3-A
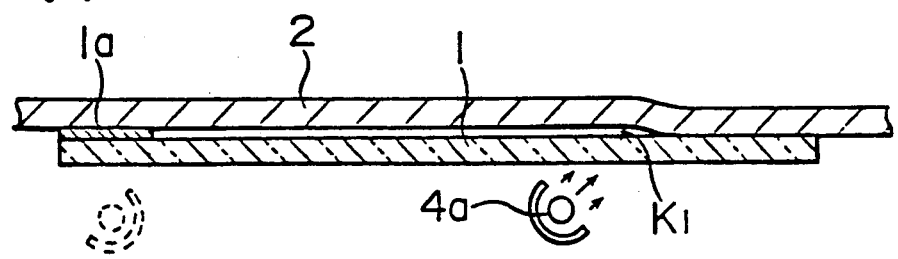
FIG. 3-B
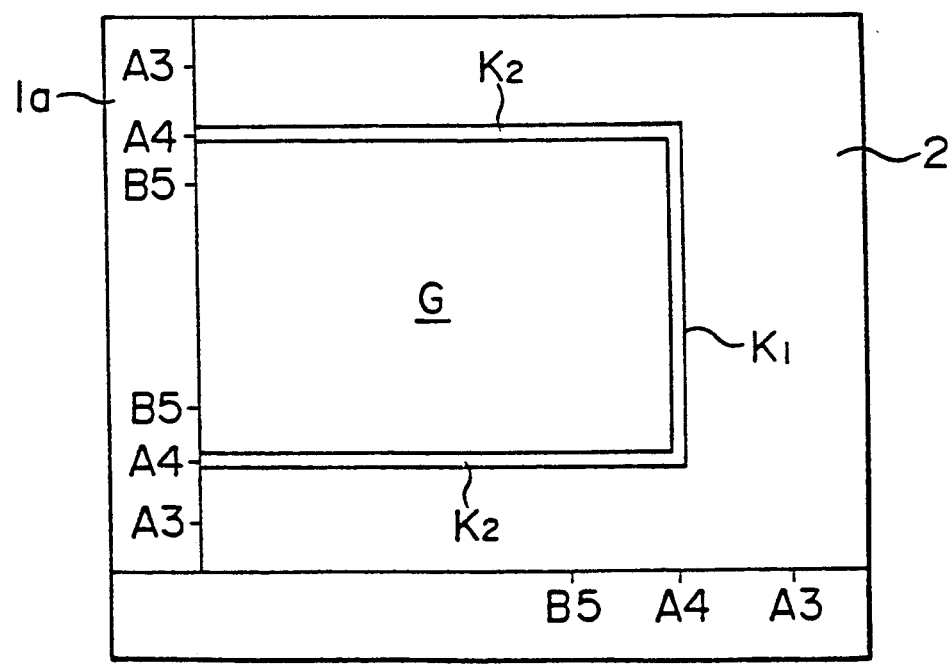

FIG. 5
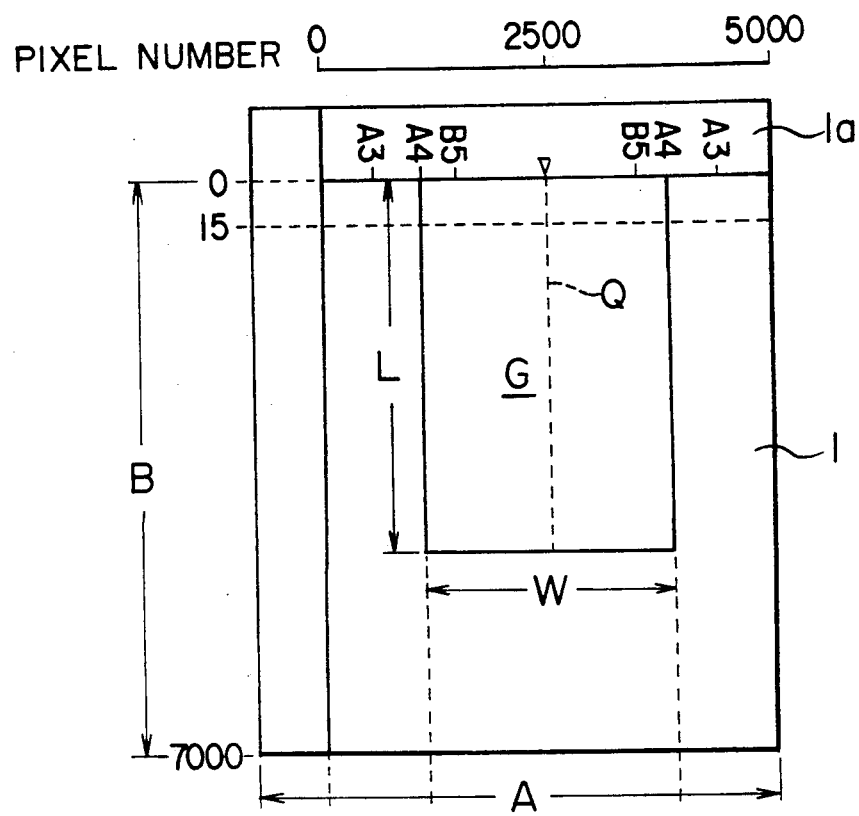
FIG. 6-A  MAIN SCANNING DIRECTION
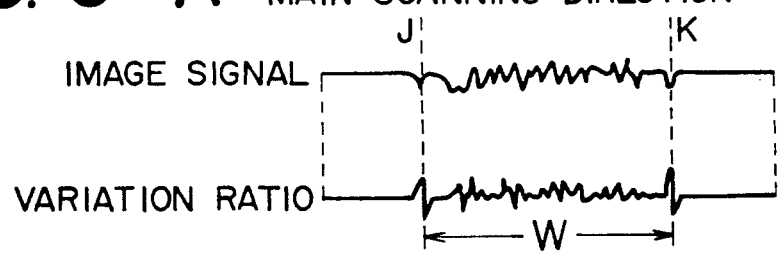
FIG. 6-B  AUXILIARY SCCANING DIRECTION
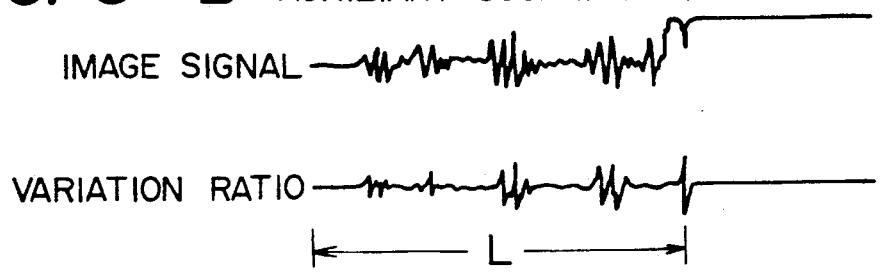

FIG. 10
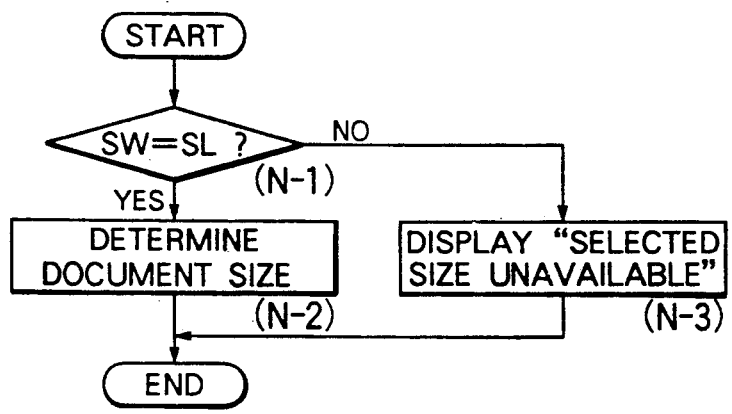
FIG. 11-A
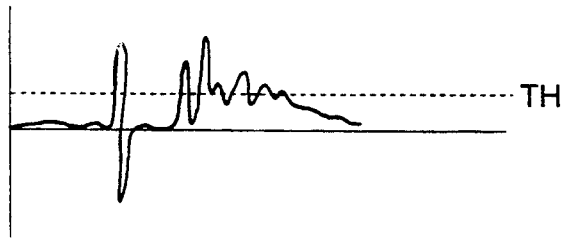
FIG. 11-B
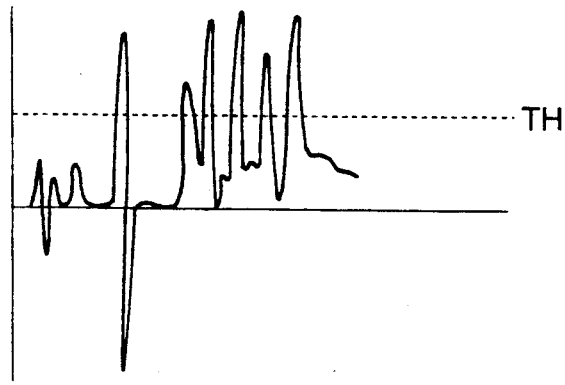

FIG. 14-A
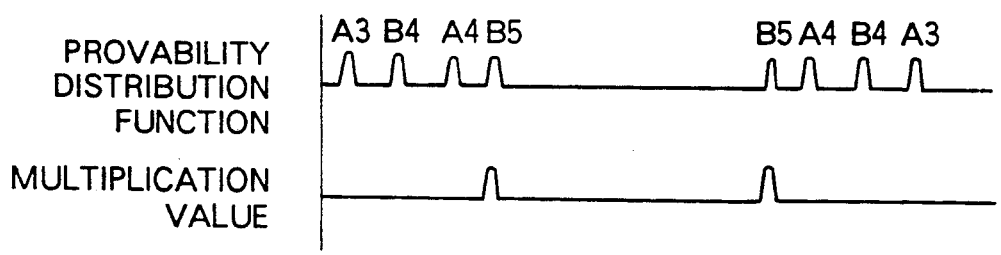
FIG. 14-B
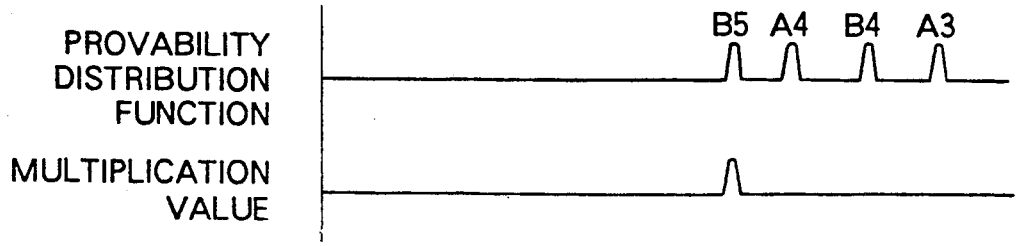

FIG. 17
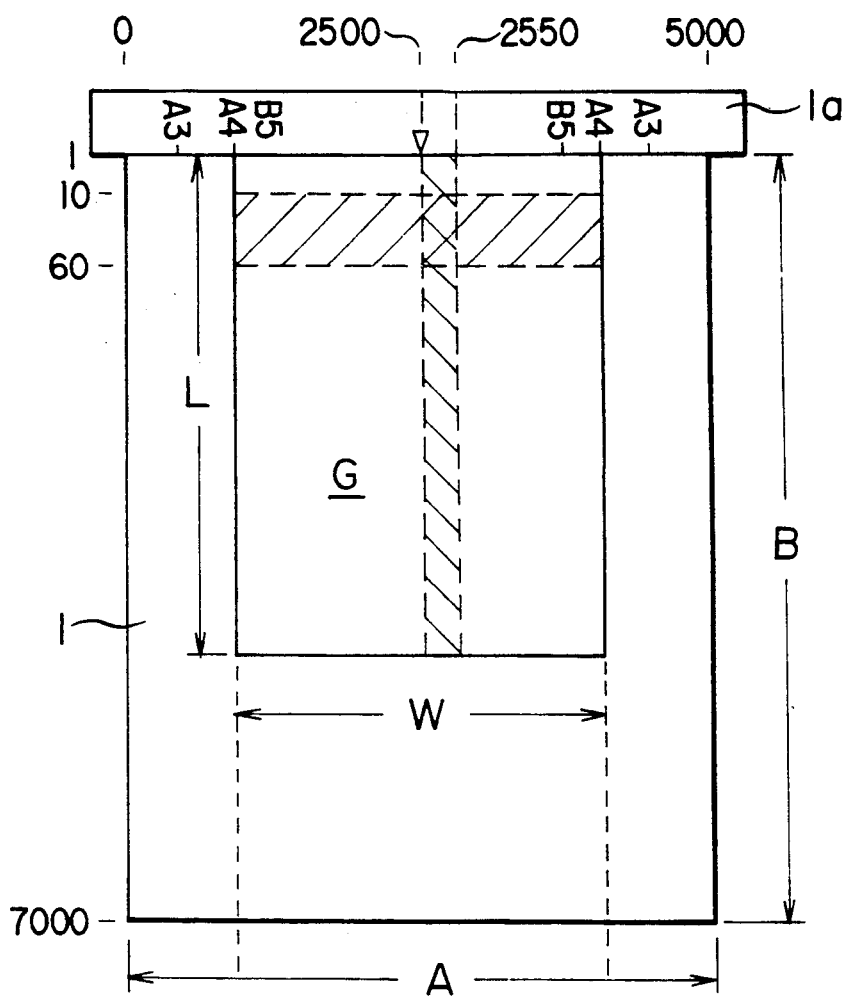
FIG. 18-A 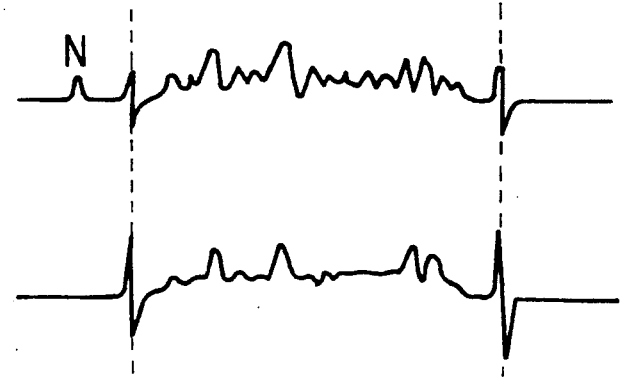
FIG. 18-B 

DOCUMENT SIZE DETECTION APPARATUS

BACKGROUND OF THE INVENTION

The present invention relates to a document size detection apparatus for an image recording apparatus wherein a document size can be detected with a document holder having thereon no device.

There has been known an image recording apparatus wherein a document is placed on a document table, the document is held down by a document holder (hereinafter referred to as "a platen cover"), the document is irradiated by a lamp from the under side of the document table, the reflected light from the document is projected directly on a photoreceptor drum through a mirror and an optical system, or the reflected light is converted once to digital signals by means of a photoelectric converting element such as a CCD for giving necessary image processing, thus an electrostatic latent image is formed on the photoreceptor drum and the electrostatic latent image is developed for recording the document.

In some of the aforementioned image recording apparatuses, a size of a document to be recorded can be detected and a recording sheet whose size corresponds to the detected size is fed automatically.

Heretofore, there have been proposed various methods for detecting document sizes. For example, there has been known a method wherein plural optical sensors are provided at the locations under the document table corresponding to document sizes, and thereby the document size can be detected by output from the optical sensor. Further, in another example, the reverse side of the platen cover is blackened or mirror-finished so that the reflected light from a document may be different from that from non-document area when the document is held by the platen cover, and thereby the document size is detected by variation in the amount of light accepted by an optical sensor when the document is scanned (for example, Japanese Patent Examined Publication No. 64-2263 and Japanese Patent Publication Open to Public Inspection (Kokai) No. 54-83438 (hereinafter referred to as Japanese Patent O. P. I. Publication)).

In the detection method mentioned above, however, the amount of reflected light from the document is reduced in the case of a transparent document used for an OHP (overhead projector) or a thin document, being affected by the black or mirror-finished- reverse side of the platen cover. Therefore, the document can not be recorded clearly, or the record is hard to read even if it can be made. Further, in the detection method mentioned above, black streaks appear on the upper and lower margins or margins at the left side and the right side of the recording paper when the document is not placed accurately at the predetermined position on the document table. Therefore, it is necessary to eliminate the black streaks, and for this purpose, it is necessary to adjust accurately the sheet feed timing for the recording sheet and to prepare the signal processing circuit that prevents the occurrence of black streaks. Furthermore, when the recording sheet used is larger than the document black or mirror-finished areas around the document are recorded on the recording sheet, which is a problem.

Further, there has been known another detection method wherein yellow stripes are drawn on the reverse side of the platen cover and the document size is detected by the difference of color between the yellow stripe and white document. This method still has the same problems as in the foregoing when a transparent or thin document is used, and in the case of a full color image, the yellow stripes are regarded as information for recording and thereby are recorded, which is also a problem.

In any conventional document size detection methods, the reverse side of a platen cover has thereon a device for detecting document size, and in some cases, this device is regarded as document information and is recorded accidentally on a recording sheet. Further, in the case of an image recording apparatus employing an automatic document feeder (called an ADF) wherein plural documents are fed automatically to the predetermined exposure position one sheet at a time by means of a conveyance belt, it is not possible to provide a device for document size detection on the conveyance belt because the position of the conveyance belt changes each time of conveyance, which is a problem.

The present invention has been devised in view of the aforementioned points, and its first object is to detect the size of a document, with no device on a platen cover, by detecting shadows cast around the document on the platen cover when the document is irradiated.

However, when a position of the shadow is detected by judging whether the variation ratio of image signals obtained through reading document information exceeds the predetermined threshold value there is a fear that the position of the shadow is detected incorrectly because the variation ratio of image signals will increase in the area surrounding the document when the platen cover is soiled.

The present invention has been devised in view of the aforementioned points and its second object is to prevent the wrong detection of the document size caused by the soiled platen cover.

Further, when a position of the shadow of the document is detected by judging whether the variation ratio of image signals obtained through reading document information exceeds the predetermined threshold value, many variation points where the variation ratio of image signals exceeds the predetermined threshold value exist not only in the side edge area of the document but also in the area inside the document including document information, and such variation points further exist even in the area surrounding the document when the platen cover is soiled. Therefore, in the method wherein a position of the shadow is detected by detecting the variation point which first exists after investigating from the starting position for scanning and the ending position for scanning, there is a fear that the document size can not be detected accurately because of possible impossibility of making a reliable judgment.

The invention has been devised in view of the aforementioned points, and its third object is to detect the document size more accurately.

SUMMARY OF THE INVENTION

For the purpose of achieving the aforementioned first object, a calculation means for calculating the variation ratios of the image signals both in the main scanning direction and the auxiliary scanning direction for the document, a detection means for detecting the outermost variation points both in the main scanning direction and the auxiliary scanning direction for the document among positions of variation points where the variation ratio of the image signals calculated in the aforesaid calculation means exceeds the threshold value, and judgment means for judging the width and the length of the document from the positions of the variation points detected by the aforementioned detection means are provided in the invention, and thus the size of the document can be detected by the judged width and length of the document.

In the aforementioned structure, the variation ratios of the image signals both in the main scanning direction and the auxiliary scanning direction for a document are calculated, and when there are some positions of variation points where the calculated variation ratio exceeds the predetermined value, the outermost positions of variation points both in the main scanning direction and the auxiliary scanning direction are detected, and the width and the length of the document are judged by the aforementioned positions of the variation points, and thereby the document size is detected by the obtained data of the width and length.

For the purpose of achieving the aforementioned second object, a calculation means for calculating the variation ratios of the image signals both in the main scanning direction and the auxiliary scanning direction for the document, a detection means for detecting the outermost variation points both in the main scanning direction and the auxiliary scanning direction for the document among positions of variation points where the variation ratio of the image signals calculated in the aforesaid calculation means exceeds the threshold value, a threshold value variation means for setting variably the threshold value in the aforementioned detection means, and judgment means for judging the width and the length of the document from the positions of the variation points detected by the aforementioned detection means are provided in the invention, and thus the threshold value in the aforementioned detection means is caused to be variable.

When the threshold value used for detecting the position of a shadow cast around the document is raised manually or raised automatically corresponding to the soil on the platen cover, the variation ratio of the image signals on the peripheral area of the document, even if it increases, can be distinguished from the variation ratio at the position of a shadow of the document.

For the purpose of attaining the aforementioned third object, there are provided in the invention, with noticing that a shadow is cast on an almost constant position for a document with a stipulated size, a calculation means for calculating the variation ratios of the image signals in the main scanning direction and in the auxiliary scanning direction for the document, a memory means wherein a probability distribution function having the maximum value at the position corresponding to the side edge position of the document with a stipulated size is stored, a detection means for detecting the positions of the outermost variation points in the main scanning direction and the auxiliary scanning direction for the document among positions of variation points where the product of the variation ratio calculated by the aforementioned calculation means and the aforementioned probability distribution function exceeds the predetermined threshold value, and a judgment means for judging the width and the length of the document from the positions of the variation points detected by the aforementioned detection means.

Due to the integration of a variation ratio of image signals and a probability distribution function, only the variation ratio due to the shadow cast on the side edge of a document remains, and the variation point for the large variation ratio existing in the area within the document itself or on the peripheral area of the document disappears.

For the purpose of achieving the aforementioned second object, the document size detection apparatus of the invention is provided with an integration means which integrates image signals in a time series obtained through reading the document information respectively in the main scanning direction and in the auxiliary scanning direction, a calculation means which calculates the variation ratio of the integrated image signals a detection means which detects the outermost positions of variation points respectively in the main scanning direction and in the auxiliary scanning direction for the document among variation points where the variation ratio of the integrated value of image signals calculated in the calculation means exceeds the predetermined threshold value, and a judgment means which judges the width and the length of the document from the positions of variation points detected by the detection means.

In place of constitution wherein image signals are integrated in both the main scanning direction and the auxiliary scanning direction and the variation ratio for the integrated image signals is calculated as described above, another constitution wherein the variation ratios for image signals in the main scanning direction and the auxiliary scanning direction are calculated first, then, the absolute values for the calculated variation ratios are calculated, and the calculated absolute values of the variation ratios are integrated in the main scanning direction and in the auxiliary scanning direction may also be applicable.

Owing to the aforementioned constitution wherein image signals are integrated both in the main scanning direction and in the auxiliary scanning direction, noise components caused by copy soil existing on the peripheral area of a document are eliminated and thereby it is possible to detect the document size based on the image data free from noise components.

BRIEF DESCRIPTION OF THE DRAWINGS

FIG. 5 is a diagram for illustrating how to scan the document for detecting the document size, FIGS. 6-A and 6-B are waveform diagrams for image signals obtained by scanning the document, FIGS. 9 and 10 are flow charts for movements for detecting the document size, each of FIGS. 11-A and 11-B shows the relation between the variation ratio of image signals and the threshold value, FIG. 17 is a diagram for illustrating an integration area for detecting the document size, FIG. 18-A shows image signals obtained through a single scanning, FIG. 18-B shows image data obtained after integration.

DETAILED DESCRIPTION OF THE INVENTION

Figure 1:
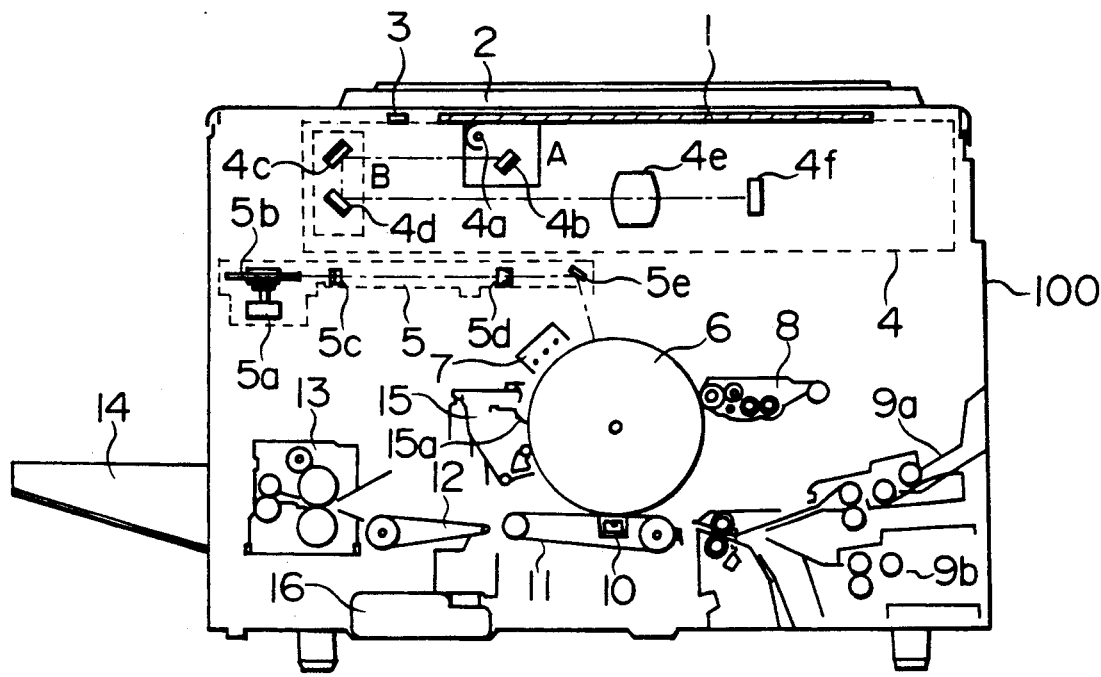
FIG. 1 is a diagram showing the schematic constitution of an example of the image forming apparatus of the invention.
Figure 2:
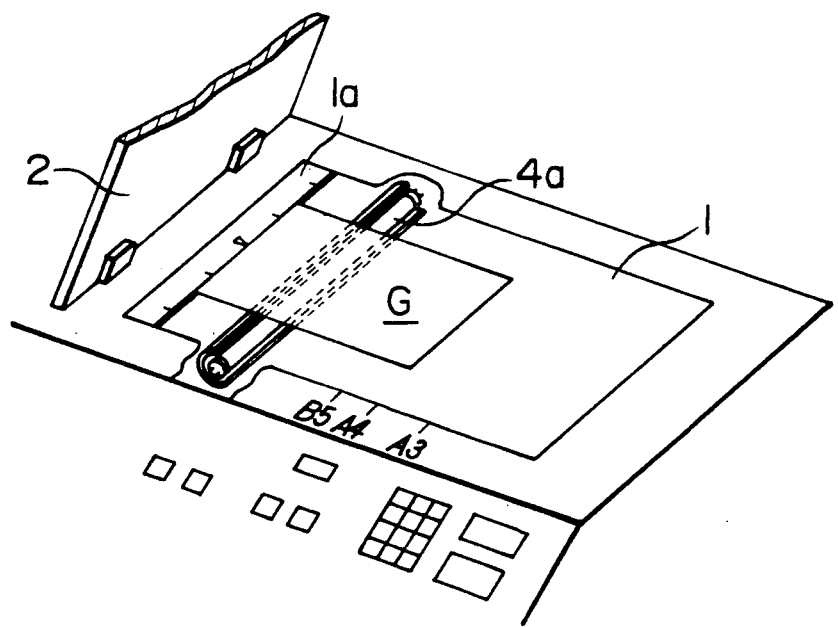
FIG. 2 is a drawing showing how a document is placed on a document table, FIG. 3-A is a side view for illustrating the shadow of the document casted on a platen cover, FIG. 3-B is a top view for FIG. 3-A.

The invention will be explained as follows, referring to the drawings.

FIG. 1 is a schematic diagram of an example of the image recording apparatus of the invention. The exemplified image recording apparatus is of a type wherein document information is read by a photoelectrical converting element such as a CCD and processed to be digital signals for formation of an optical image.

The structure for image forming in the apparatus mentioned above will be explained briefly as follows because it has been known widely, and it is not an essential point of the invention.

On the top of apparatus main body 100, there is provided document table 1 that is a transparent glass on which a document to be recorded is placed, and the document table 1 is provided with platen cover 2 which holds a document placed on the document table. On the left edge of the document table 1, there is provided white standard plate 3 that is for shading correction so that the white standard plate 3 may be on the same level as the document table 1.

Under the document table 1, there is provided optical scanning system 4 (shown with broken lines) composed of exposure lamp 4a for illuminating the document, mirrors 4b, 4c and 4d on which the reflected light from the document is reflected, and CCD 4f that receives and photoelectrically converts the reflected light. Among the structural elements for the optical scanning system 4, unit A composed of exposure lamp 4a and mirror 4b illuminates the surface of the document while traveling in parallel with the document table 1 at the speed of v. In this case, unit B composed of mirrors 4c and 4d moves in the direction identical to that of the unit A at the speed of $\frac{1}{2}$ v.

Writing unit 5 enclosed and shown with broken lines consists of rotating polygonal mirror (called a polygon mirror) 5b that is driven by motor 5a to rotate at a high speed, f$\theta$ lens 5c, cylindrical lens 5d and mirror 5e, and a laser beam that is modulated by digital image signals outputted from CCD 4f and is outputted from an unillustrated laser source is deflected to an extent equivalent to one scanning repeatedly by the rotating polygonal mirror 5b, and then is reflected by mirror 5e, thus, an electrostatic latent image of the document information is formed on the surface of photoreceptor drum 6.

The surface of the photoreceptor drum 6 is uniformly charged by charging electrode 7, and the electrostatic latent image formed by the laser beam is developed by developing unit 8 of a magnetic brush type. On the other hand, a recording sheet is fed from sheet feeding cassette 9a or sheet feeding cassette 9b, and a visual image on the photoreceptor drum 6 is transferred onto the recording sheet by transfer electrode 10. The recording sheet on which the visual image has been transferred is transported by transfer belt 11 and further transported by transport belt 12 to fixing unit 13 where the image is fixed and the recording sheet is ejected onto sheet delivery tray 14.

Residual toners staying on the surface of the photoreceptor drum 6 from which the recording sheet has been separated after transferring are removed by blade 15a at cleaning unit 15 and they are collected into toner recovery box 16 which is provided on the bottom of the apparatus main body 100.

In the image recording apparatus having the structure mentioned above, when a document is placed on document table 1 for recording the document information, the leading edge of the document G is caused to touch document stopper plate 1a, then, the document is positioned to the stipulated location based on the size mark indicated on the document stopper plate 1a, and the document is held by the platen cover 2. When recording button P is pressed, the optical scanning system 4 starts moving so that document G may be illuminated by exposure lamp 4a. Since reflection mirror of the exposure lamp 4a is arranged as shown in FIG. 3-A so that irradiating light from the lamp 4a may face backward (toward right upper direction in the drawing), shadow $K_1$ of the document is cast on the platen cover 2 at the trailing edge of the document G. FIG. 3-B shows the shadow $K_1$ casted on the platen cover 2 on a top view basis. The shadow is cast not only at the trailing edge of the document G but also at both side edges at left and right of the document as shadows $K_2$. If the reflection mirror of the exposure lamp 4a is arranged as shown with chain lines in FIG. 3-A, the shadow $K_1$ is not cast on the platen cover 2.

Figure 4:
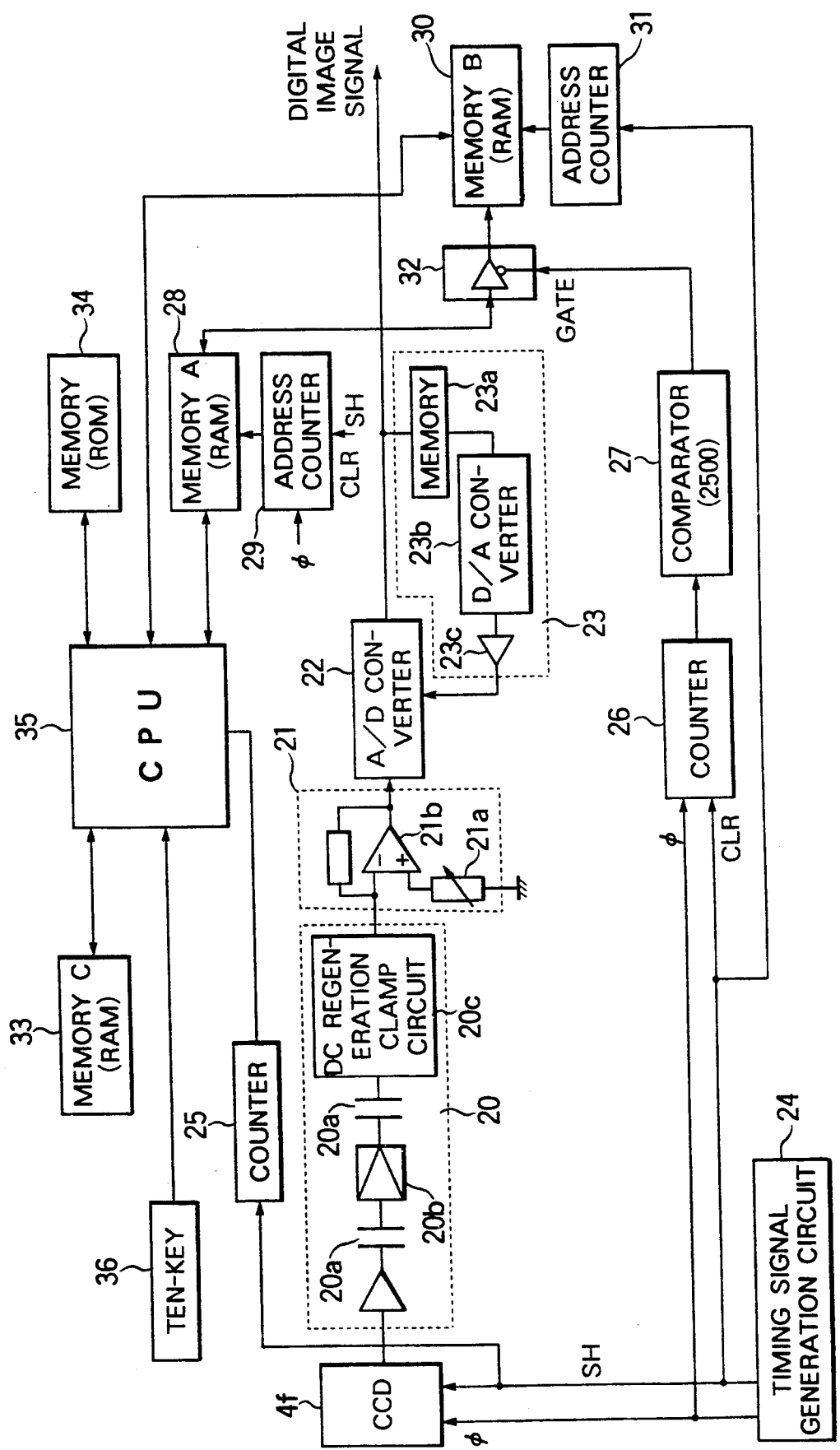
FIG. 4 is a block diagram for a document size detection circuit for the image forming apparatus of the invention.

In the invention, the document size is detected by utilizing the shadow $K_1$ cast at the trailing edge of the document and the shadows $K_2$ cast on both side edges of the document, and FIG. 4 shows a block diagram of an example of the document size detection apparatus related to the invention.

In FIG. 4 of the drawings CCD 4f forms a part of the optical scanning system 4 as explained relating to FIG. 1, and image signals of the document information output from the CCD 4f are processed by analog signal processing circuit 20 consisting of capacitor 20a for cutting DC component, amplifier 20b and DC regeneration clamp circuit 20c, then, gain-adjusted by gain adjustment circuit 21 consisting of offset adjuster 21a and operation amplifier 21b, converted by high speed type A/D converter 22 into digital signals, and then shading-compensated by shading compensation circuit 23. After that, the digital signals are used for modulation of laser beam as digital image signals. The shading compensation circuit 23 is composed of memory 23a for storing image signals obtained by reading information of white standard plate 3 (see FIG. 1), D/A converter 23b for converting image signals read out from the memory 23a into analog signals and amplifier 23c. When white image information obtained from white standard plate 3 is converted by D/A converter 23b into analog signals a given standard voltage of A/D converter 22, unevenness of illumination of lamp 4a and deterioration thereof as well as uneven sensitivity of a pixel of CCD 4f are compensated.

Timing generation circuit 24 generates clock signals φ and shutter signals S for switching scanning in the main scanning direction, while, CCD 4f outputs image signals with timing of clock signals φ.

Counter 25 counts shutter signals SH and counter 26 counts clock signals φ. Comparator 27 outputs "H" signal equivalent to one pixel when counted value of counter 26 reaches the predetermined value (2500, in the present example, which is determined as the number of pixels at the center point when the recording sheet of A4 size, for example, is scanned in the main scanning direction as shown in FIG. 4).

Memory (A) 28 writes digital image signals based on the address signals output from address counter 29. Address counter 29 counts clock signals φ and cleared by shutter signals SH. Memory (B) 30 writes digital image signals through gate circuit 32 based on address signals from address counter 31 that counts signals of shutter signal SH only when "H" signals are outputted from the comparator 27. Memory (C) 33 stores the variation ratio obtained through the differential processing of the digital image signals. In memory 34, there are stored size table for the longitudinal and lateral lengths for the standard document sizes and a probability distribution function used for raising the sureness for detection of document sizes. The numeral 35 is a CPU which conducts differential processing on image signals and calculates the width and the length of the document using data stored in memory (A) 28, memory (B) 30, memory (C) 33 and memory 34, the numeral 36 is a ten-key used for setting the number of sheets for recording and for changing the threshold value used for detecting the position of a shadow of the document.

Next, the operation for detecting the document size in the invention will be explained as follows, referring to FIGS. 7 and 8.

Before the explanation, of the operation, the principle of detection of the document size in the invention will be explained When document G is placed on document table 1 as shown in FIG. 5 and when the document G is scanned, signals shown in FIG. 6-A are obtained as image signals for one line. When such image signals are subjected to differential calculation for obtaining the variation ratio of the signals, the results thereof are those shown in the lower portion in the same figure. As is clear from the figure, the variation ratio is greater at the side edges in the lateral direction of the document. Therefore, it is possible to obtain the width W of the document G by obtaining the positions J and K for the variation points.

Likewise, from image signals equivalent to plural lines obtained by scanning the full page of the document G, when image signals at the specific point (shown with broken line Q in FIG. 5) when viewed in the main scanning direction are collected in the auxiliary scanning direction, the results are those shown in FIG. 6-B. When these image signals are subjected to differential calculation and thereby the variation ratio of the signals is obtained, the results are those shown in the lower portion in the same figure. It is therefore possible to obtain the length of the document G by obtaining the position T for the variation point where the variation ratio exceeds the threshold value for the first time from the point of the trailing edge of the document.

In the explanation below, the document information is read with a resolution of 16 dots/mm, and when the document is placed on the document table 1 so that the leading edge of the document G may touch the document stopper plate 1a as shown in FIG. 5, the number of the pixel located at the leftmost position in the main scanning direction on the reading area of the document glass surface is determined to be "0" and the number of the rightmost pixel is determined to be "5000", and the number of the scanning line located at the tip position in the auxiliary scanning direction is determined to be 0 and the number of the scanning line located at the rearmost position on the reading area of the document glass surface is determined to be 7000. For the detection of the width of the document, on the other hand, image data obtained from the 15th scanning line is used, and for the detection of the length of the document, image signals at the position of the pixel number of "2500" are used.

Since the standard positions of units A and B of the optical scanning system 4 (home positions) are close to the document stopper plate 1a on the apparatus main body 100, when recording button P is pressed and exposure lamp 4a is lit, the reflected light from the white standard plate 3 is received by CCD 4f and image data output from A/D converter 22 are stored in memory 23a of shading compensation circuit 23 and used as shading compensation data in image reading operation.

Figure 7:
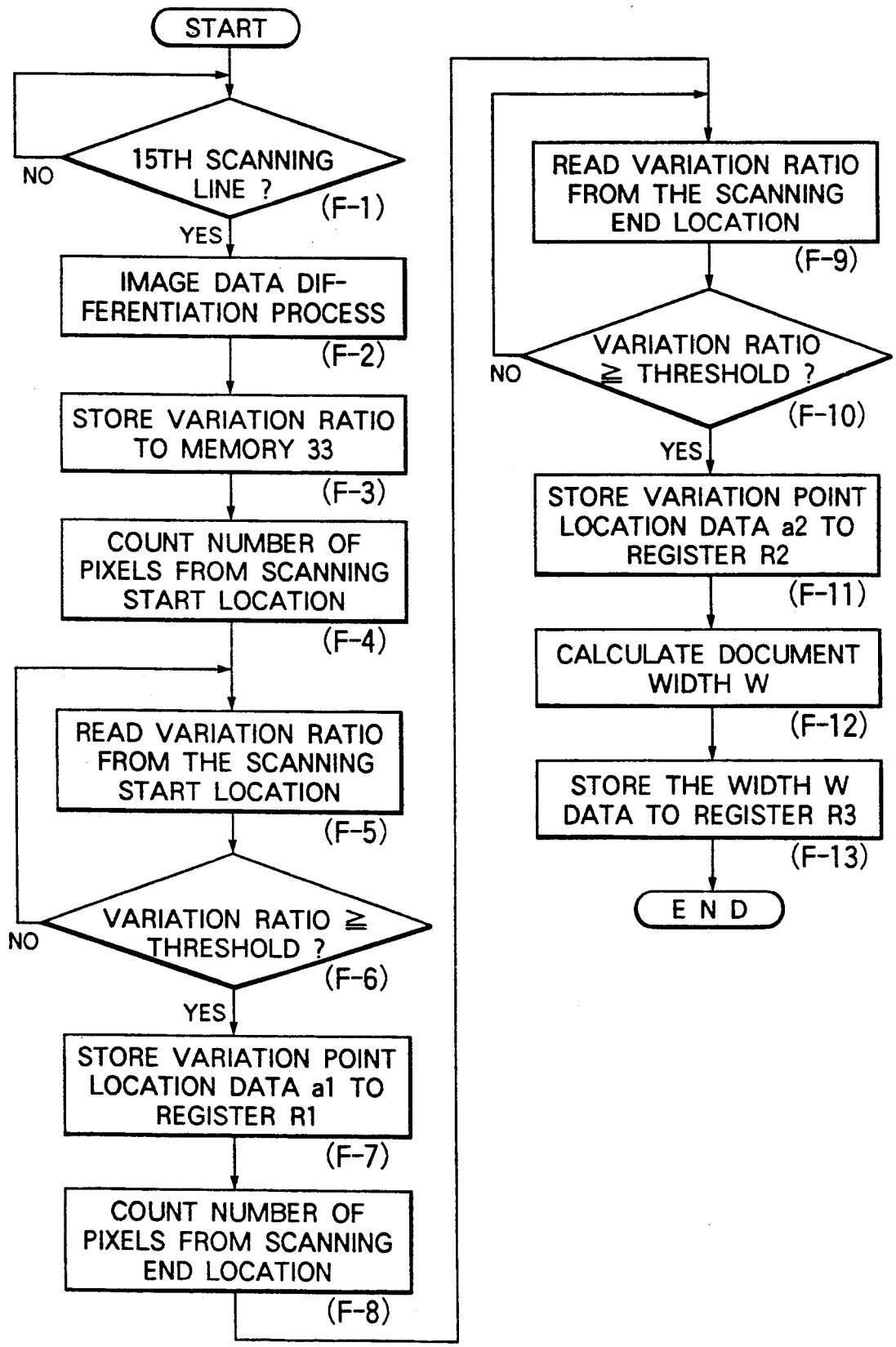
FIG. 7 is a flow chart of movements for detecting the width of the document.
Figure 8:
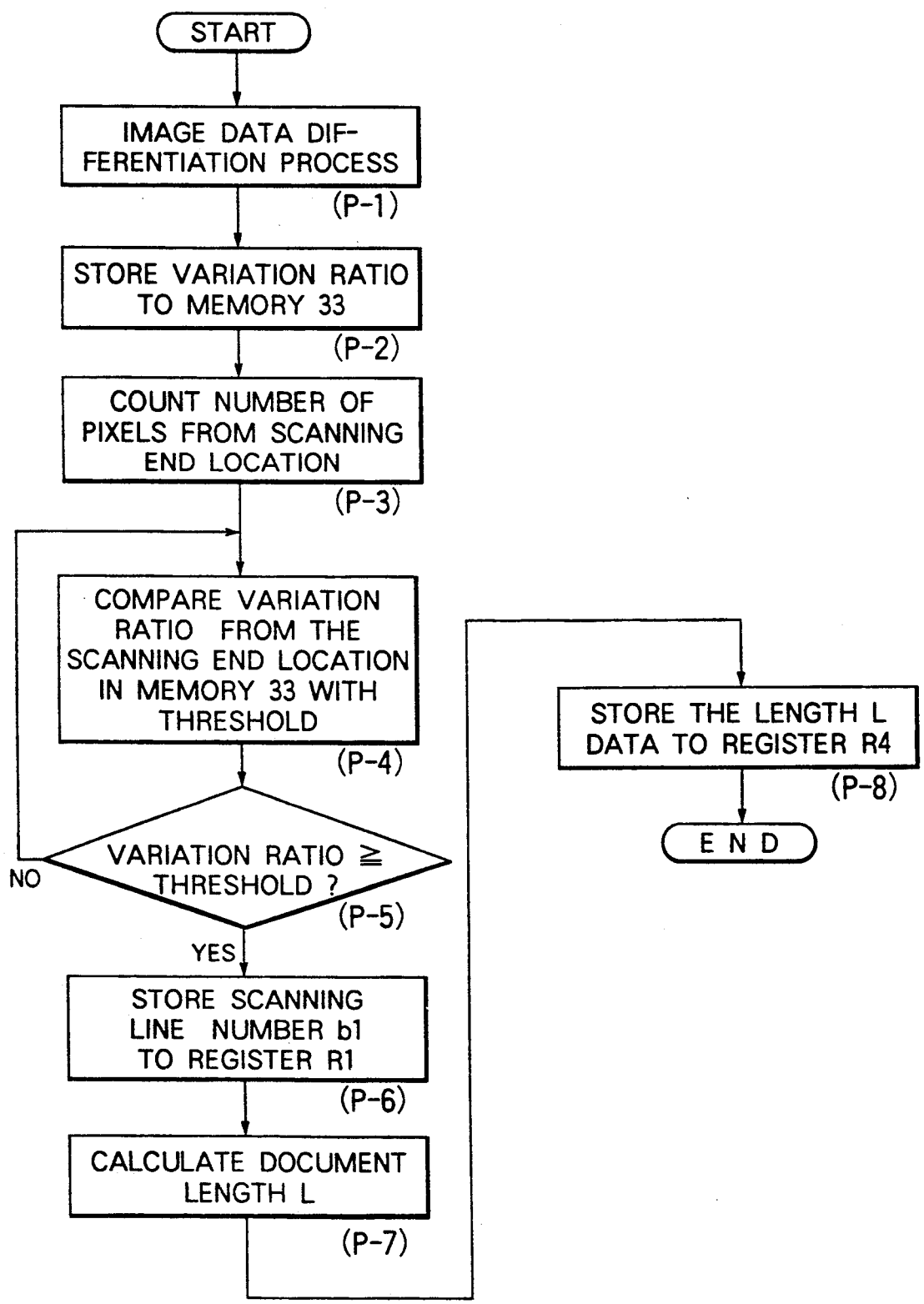
FIG. 8 is a flow chart of movements for detecting the length of the document.

FIG. 7 is a flow chart of movements of detection for the width of the document and FIG. 8 is a flow chart of movements for detection of the length of the document, and in both cases, movements are started when recording button is pressed.

First, the operation for detection of the width of the document will be explained, referring to FIG. 7.

When recording button P is pressed and thereby the recording operation is started, exposure lamp 4a of the optical scanning system 4 is lit and units A and B start moving.

Since counter 25 counts shutter signal SH for switching the main scanning for the document G, whether the 15th scanning line made by the optical scanning system 4 is completed or not is judged from the counted value, and when it is completed, it is called for differential calculation (F-2) because the image data obtained from scanning of the line is stored in memory (A) 28. The variation ratio obtained after differential calculus is stored in memory (C) 33 (F-3). Then, the number of pixels is counted successively beginning with a pixel having the pixel number of "0" located at the scanning start location (F-4), and the variation ratios stored in memory (C) 33 are read successively from the pixel number of "0" (F-5). Then, the read variation ratio is examined to determine whether or not it is lower than the threshold value (F-6), and when it is not lower than the threshold value, the number of pixel $a_1$ where the variation ratio first exceeds the threshold value is stored in register $R_1$ built in CPU 35 as position data of the variation point (F-7).

After the foregoing, the number of pixels is counted successively from the pixel having the pixel number of "5000" that is located at the scanning end location (F-8), and the variation ratios stored in memory (C) 33 are read successively from the pixel number of "5000" (F-9). Then, the read variation ratio is examined whether it is not lower than the threshold value or not (F-10), and when it is not lower than the threshold value, the number of pixel $a_2$ where the variation ratio first exceeds the threshold value is stored in register $R_2$ built in CPU 35 as position data of the variation point (F-11).

The number of pixel $a_1$ and that of $a_2$ which represent position data of the variation point obtained in the above manner are used in the following expression for calculating the width W of the document G (F-12).

Width of document W (mm) = 1/16 {5000 − ($a_1 + a_2$)} The data of the width W thus obtained are stored in register $R_3$ built in CPU 35 (F-13).

Next, the operation for detection of the length of the document will be explained, referring to FIG. 8.

In FIG. 4, counter 26 counts clock signals $\phi$ and when the counted value reaches 2500, namely, when the image information of the pixel having the pixel number of "2500" is read, "H" signal equivalent to one pixel is output from comparator 27. Therefore, the AND conditions for the GATE circuit 32 are satisfied, and image data are stored in memory (B) 30. The counter 26 is cleared for each shutter signal, thus, same operation is repeated for each line scanning and the image information of the pixel having the pixel number of "2500" among all scanning lines is stored in memory (B) 30 as pixel data.

In FIG. 8, image data stored in memory (B) 30 are read and subjected to differential calculation (P-1), and the variation ratio is once stored in memory (C) 33 (P-2). Then, the number of lines is counted from the last scanning line, namely the line having the scanning number of "7000" (P-3), and the variation ratios stored in memory (C) 33 are read and compared with the threshold value (P-4). When the comparison shows that the variation ratio exceeds the threshold value (P-5), the number of line $b_1$ where the the variation ratio first exceeds the threshold value is stored in register $R_1$ built in CPU 35 as position data of the variation point (P-6).

The number of scanning line $b_1$ which represents position data and obtained in the above manner is used in the following expression for calculating the length L of the document G (P-7).

Length of document L (mm) = 1/16 (7000 − $b_1$)

The data of the length L thus obtained are stored in register $R_4$ built in CPU 35 (P-8).

The data of the width W and the length L obtained in the above manner are used in the following method for detection of the document size.

Sheets to be used normally belong to either A series or B series in size, and their sizes are standardized as shown in the table below.

| Size | Width (mm) | Length (mm) |
| --- | --- | --- |
| B5 width | 257 | 183 |
| A4 width | 297 | 210 |
| B5 length | 183 | 257 |
| A4 length | 210 | 297 |
| B4 | 257 | 362 |
| A3 | 297 | 420 |

Since the data in the above table are stored in memory 34 as a size table, it is possible to determine the document size by judging where the combination of the width (W) and the length (L) obtained from the above calculation falls in the table.

Figure 9:
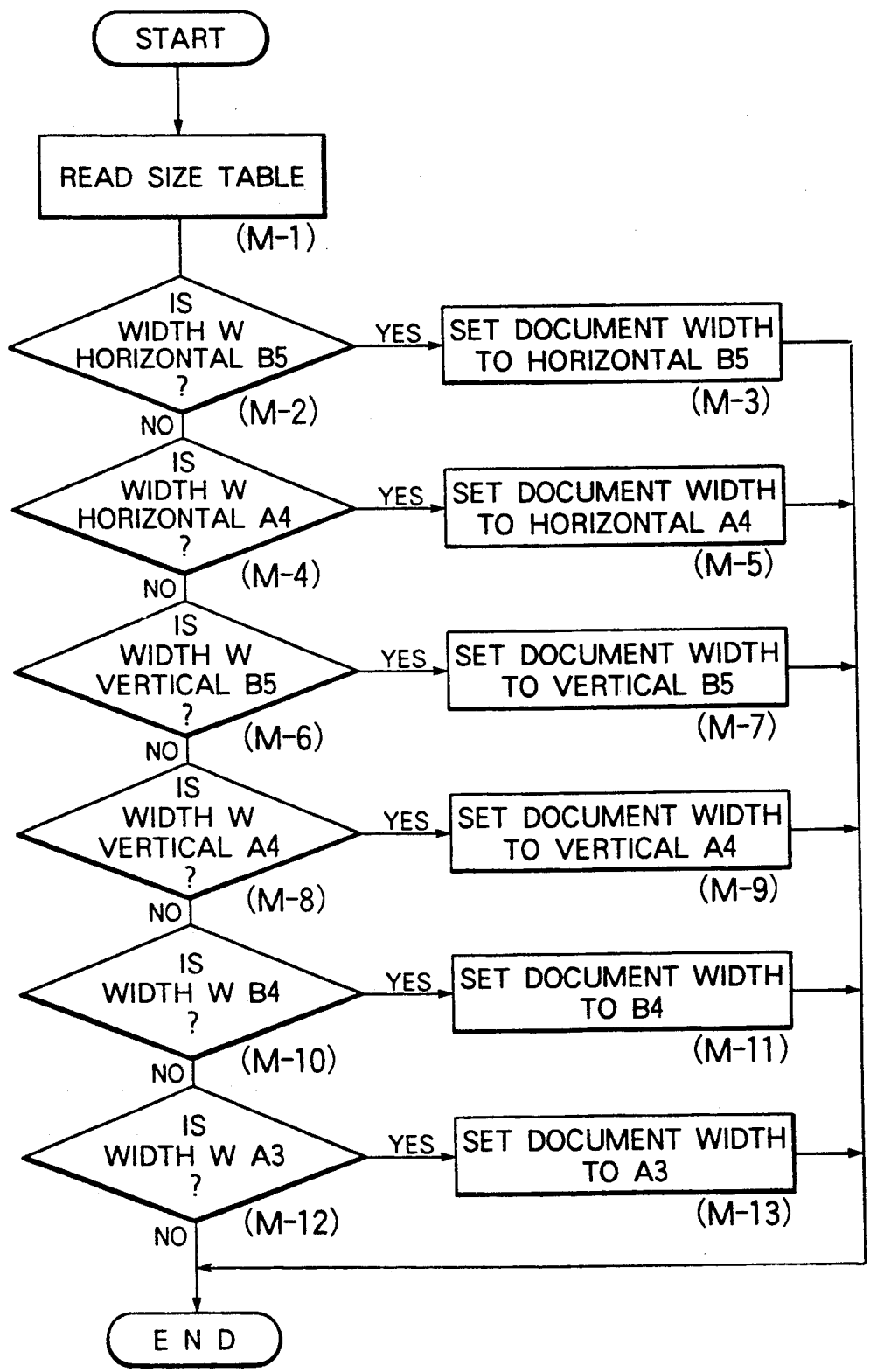

FIG. 9 is a flow chart of the operation for width determination which is a preliminary step for the operation of determining the document size.

First, a size table stored in memory 34 is read (M-1), and the width (W) obtained from calculation is judged whether it is B5 width or not (M-2). When the result of the judgment shows that it is B5 width, "B5 width" is set in register $R_5$ in CPU 35 as width size $S_w$ (M-3). When it is not B5 width, as a result of judgment, it is then judged whether it is A4 width or not (M-4). If it is A4 width, "A4 width" is stored in $R_5$ in CPU 35 as width size $B_w$ (M-5). After that, B5 length, A4 length, B4 and A3 are judged in the same way in succession, for setting coinciding one in register $R_4$ in CPU 35, if any (M-6 - M-13).

In the same way, the size is judged even for the length L of the document, although it is not illustrated, the coinciding size, if any, is set in register $R_5$ in CPU 35 as length size L.

After that, as shown in FIG. 10, the sheet size $S_w$ determined through judgment of the width and the sheet size $S_1$ determined through judgment of the length are judged whether they are the same or not (N-1). When they are the same, that size is determined as the size of the document G (N-2), but when they are not the same, "no coinciding size" may be indicated, or when they include width B5 and length A3, the larger size may be selected and outputted (N-3).

Incidentally, platen cover 2 is contaminated with toners and others while it is being used. Therefore, when a document is scanned without noticing the soil, the variation ratio for the image signals obtained therefrom sometimes takes a greater value at the peripheral area of the document, resulting in the erroneous detection of the document size.

In view of the aforementioned second object of the invention, in the above example, an operator can set the higher threshold value by operating ten-key 36 in the predetermined sequence when the operator notices the soil on the platen cover.

FIG. 11-A shows the relation between image signals and threshold values for an unsoiled platen cover, and FIG. 11-B shows the same relation for a soiled platen cover. When the platen cover is soiled, it is possible to prevent that the peripheral area of the document is affected by the soil by raising level TH of the threshold value.

Changing of the threshold value for variable setting may either be conducted by an operator manually when the operator notices the soil on the reverse side of a platen cover, or it may be conducted automatically through the judgment of the level of the soil by means of the usage of image signals. The changing of the threshold value may further be made through operation of a ten-key, or it may also be made through the method wherein either of a button for "much soiled" and a button for "less soiled" provided on an operation panel on the top of the apparatus main body is pressed depending on the level of the soil.

Next, an example for attaining the aforementioned third object will be explained.

Figure 12:
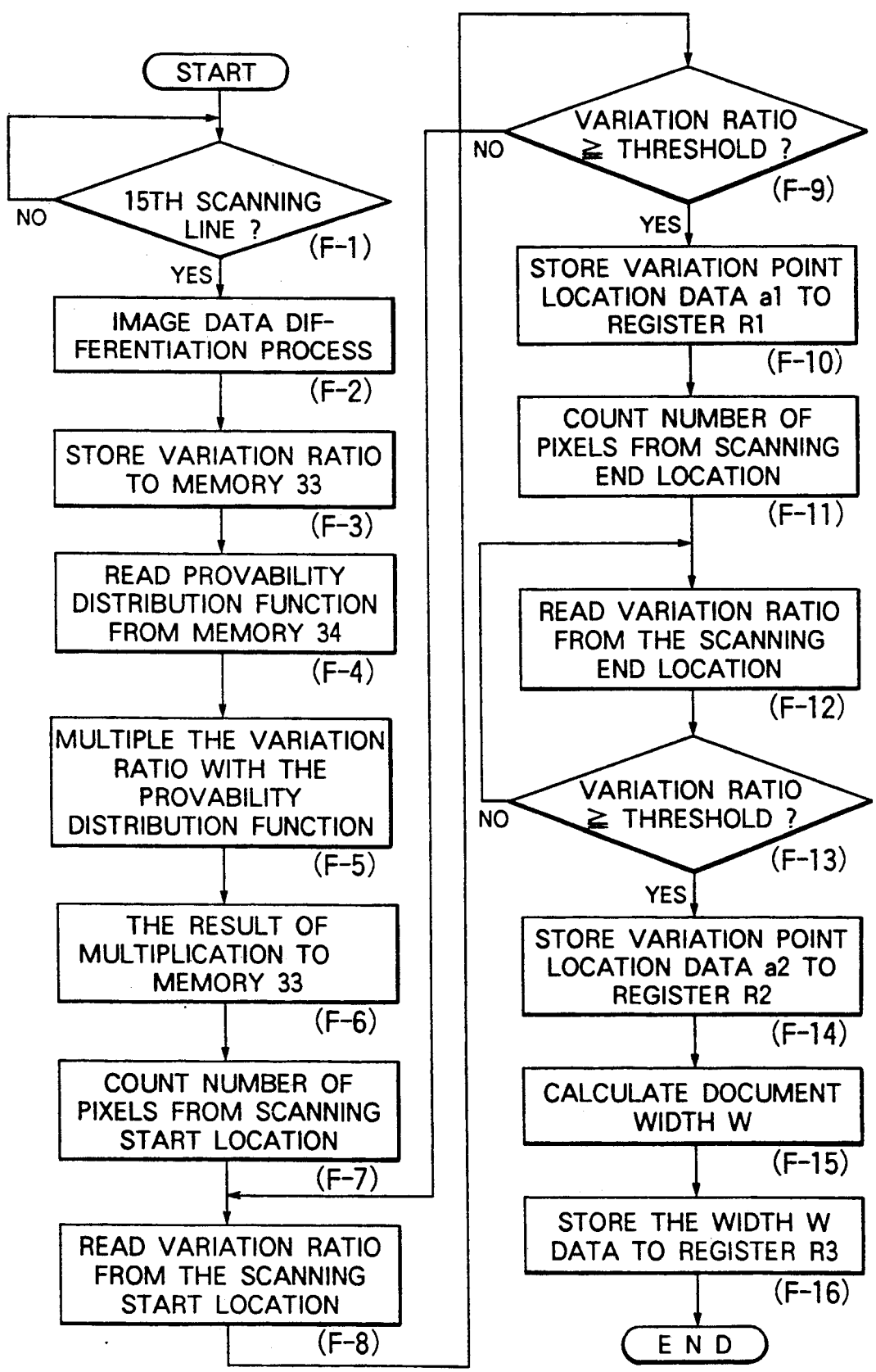
FIG. 12 is a flow chart of movements for detecting the width of the document.
Figure 13:
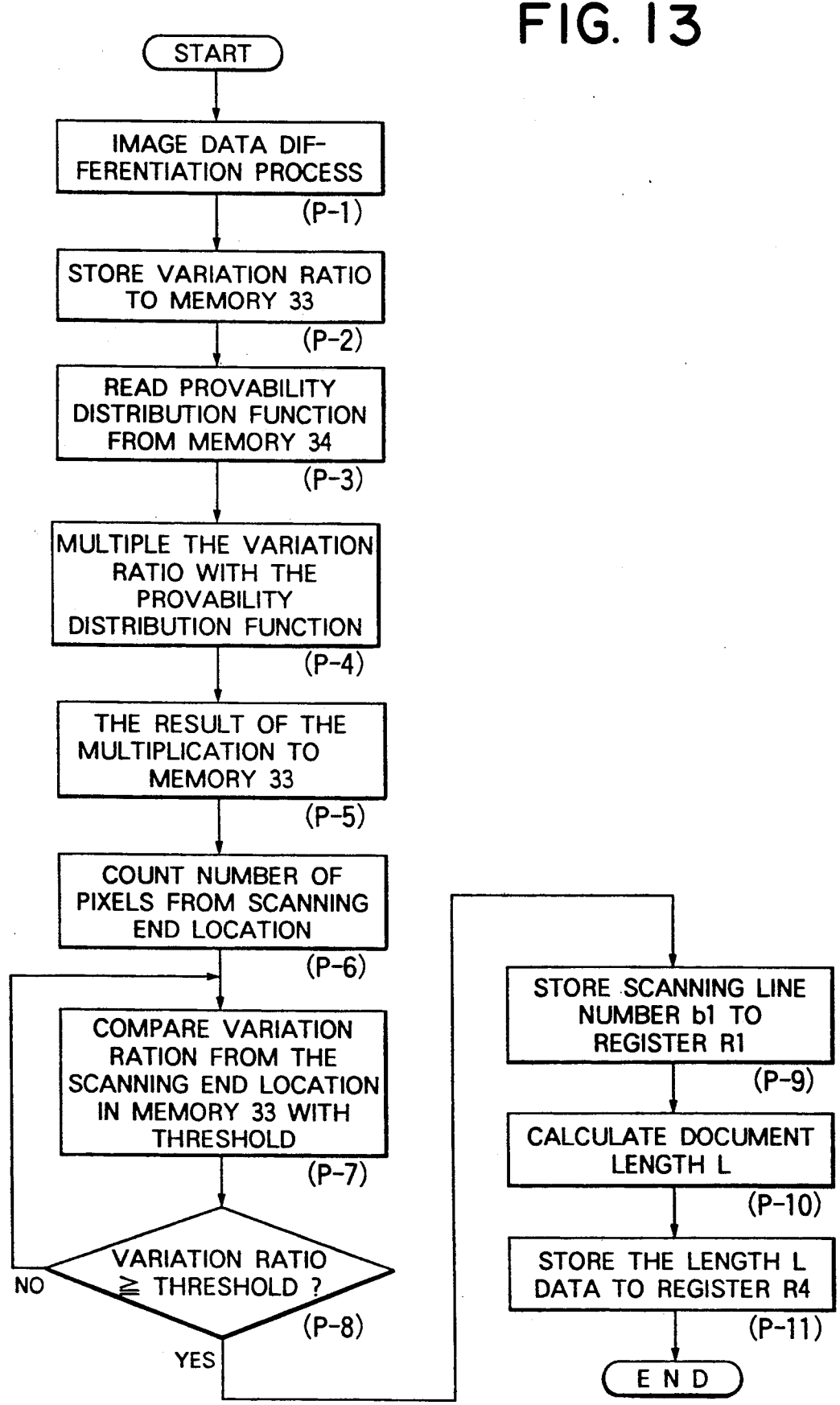
FIG. 13 is a flow chart of movements for detecting the length of the document, FIG. 14-A is a waveform diagram of a probability distribution function used for detecting the width of the document, FIG. 14-B is a waveform diagram of a probability distribution function used for detecting the length of the document.

FIG. 12 shows a flow chart of movements for detection of the width of a document and FIG. 13 shows a flow chart of movements for detection of the length thereof, and in both cases, movements are started when recording button P is pressed.

First, the movements for detectin of the width of the document will be explained, referring to FIG. 12.

When the recording button P is pressed and recording movements are started, exposure lamp 4a of optical scanning system 4 is lit, and units A and B start moving. Since counter 25 counts shutter, signal SH that switches main scanning for document G, judgment is made from the counted value whether the optical scanning system 4 has finished scanning the 15th line or not (F-1), when it has finished scanning, the image data obtained from scanning of the line and stored in memory (A) 28 are called for access and subjected to differential calculation (F-2). The variation ratios obtained after differential calculation are stored in memory (C) 33 (F-3).

A probability distribution function stored in memory 34 is read (F-4). The probability distribution function includes a distribution function having the maximum value at a side edge position in lateral direction of each of standard document sizes of B5, A4, B4 and A3 as shown in FIG. 14-A and a distribution function having the maximum value at the trailing edge of each of standard document sizes as shown in FIG. 14-B. After that, the read probability distribution function and the variation ratio stored in memory (C) 33 are integrated each other (F-5). As a result, if the document size being detected is B5, the integrated value shows a waveform having the peak value at the side edge position of the document with a B5 size as shown in FIG. 14-A. This integrated value is stored in the memory (C) 33 again (F-6). Then, the pixel numbers are counted from the position of start scanning, namely from the pixel with the pixel number of "0" successively (F-7), and the variation ratios stored in the memory (C) 33 are read in succession from the pixel number of "0" (F-8). Then, the read variation ratio is examined whether it is not lower than the threshold value or not (F-9), and when it is not lower than the threshold value, the pixel number $a_1$ where the variation ratio first exceeds the threshold value is stored in register $R_1$ built in CPU 35 as position data of the variation point (F-10).

Next, the pixel numbers are counted in succession from the scanning end location, namely from the pixel having the pixel number of "5000" (F-11), and the variation ratios stored in the memory (C) 33 are read in succession from the pixel number of "5000" (F-12). Then, the read variation ratio is examined whether it is not lower than the threshold value or not (F-13), and if it is not lower than the threshold value, the pixel number $a_2$ where the variation ratio first exceeds the threshold value is stored in register $R_2$ in CPU 35 as position data of the variation point (F-14).

The pixel numbers $a_1$ and $a_2$ which are obtained in the above manner as position data of the variation point are used in the following expression for calculating the width W or the document G (F-15).

Width of document (mm) = $1/16 \{5000 - (a_1 + a_2)\}$

The data of the width W thus obtained are stored in register $R_3$ built in CPU 35 (F-16).

Next, the movements for detection of the length of the document will be explained, referring to FIG. 13.

In FIG. 4, counter 26 counts clock signals $\phi$ and when the counted value reaches 2500, namely, when the image information of the pixel having the pixel number of "2500" is read, "H" signal equivalent to one pixel is outputted from comparator 27. Therefore, the AND conditions for the AND circuit 32 are satisfied, and image data are stored in memory (B) 30. The counter 26 is cleared for each shutter signal, thus, same operation is repeated for each line scanning and the image information of the pixel having the pixel number of "2500" among all scanning lines is stored in memory (B) 30 as pixel data.

In FIG. 13, image data stored in memory (B) 30 are read and subjected to differential calculation (P-1), and the variation ratio is once stored in memory (C) 33 (P-2).

Then, the probability distribution function shown in FIG. 14-A and stored in memory 34 are read (P-3) and are integrated with the variation ratios stored in memory (C) 33 (P-4). Incidentally, the probability distribution function in FIG. 9 may also be a step function wherein the area for the standard document sizes is represented by "1" and other area is represented by "0", for obtaining the same effect, and aforementioned other area may also be represented by "0.5" in place of "0". As a result, if the document size which is being detected is B5, the integrated value shows a waveform shown in FIG. 14-B. This integrated value is stored in memory 33 again (P-5). Then, the number of lines is counted from the last scanning line, namely the line having the scanning number of "7000" (P-6), and the variation ratios stored in memory (C) 33 are read and compared with the threshold value (P-7). When the comparison shows that the variation ratio exceeds the threshold value (P-8), the number of line $b_1$ where the the variation ratio first exceeds the threshold value is stored in register $R_1$ built in CPU 35 as position data of the variation point (P-9).

The number of scanning line $b_1$ which represents position data and obtained in the above manner is used in the following expression for calculating the length L of the document G (P-10).

Length of document L (mm) = $1/16 (7000 - b_1)$,,,,,

The data of the length L thus obtained are stored in register $R_4$ built in CPU 35 (P-11).

Figure 15:
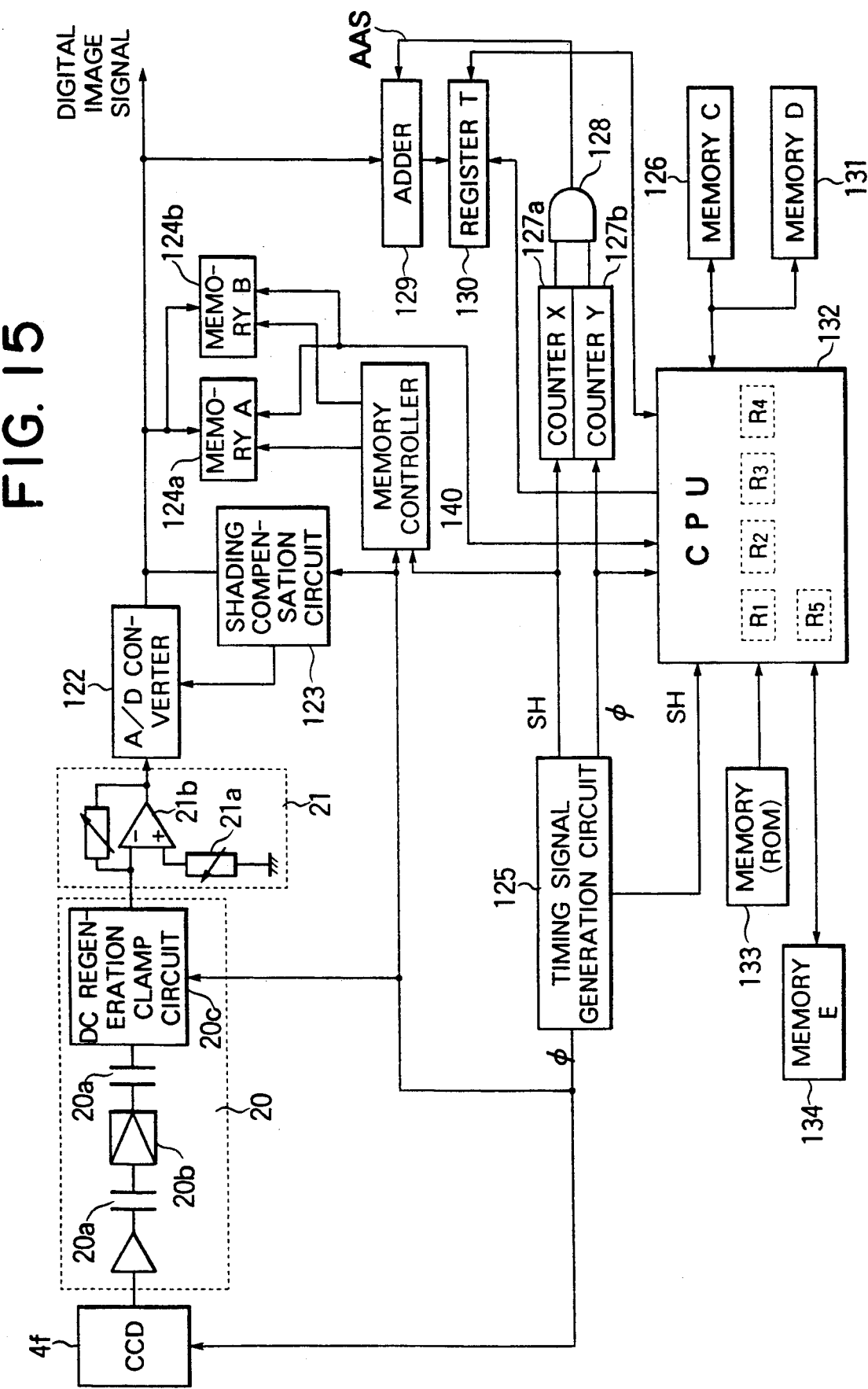
FIG. 15 is a block diagram of an example of the document size detection apparatus related to the invention.

Next, an example for attaining the aforementioned second object of the invention will be explained. In FIG. 15, CCD 4f forms a part of the optical scanning system 4 as explained relating to FIG. 1 and image signals of the document information output from the CCD 4f are processed by analog signal processing circuit 20 consisting of capacitor 20a for cutting DC component, amplifier 20b and DC regeneration clamp circuit 20c, then, gain-adjusted by gain adjustment circuit 21 consisting of offset adjuster 21a and operation amplifier 21b, converted by high speed type A/D converter 122 into digital signals, and then shading compensated by shading compensation circuit 123. After that, the digital signals are used for modulation of laser beam as digital image signals. The shading compensation circuit 123 stores image signals obtained by reading information of white standard plate 3 (see FIG. 1), converts them to analog signals, and and impresses them as standard voltage of A/D converter 122, thus, unevenness of illumination of lamp 4a and deterioration thereof as well as uneven sensitivity of a pixel of CCD 4f are compensated.

Image data of the document information outputted from the A/D converter 122 are stored in memory (A) 124a and in memory (B) 124b alternately for every one line of scanning. Timing signal generation circuit 125 generates clock signals $\phi$ for controlling those such as driving timing for CCD 4f, switching timing for A/D converter 122 and shading compensation circuit 123, and writing or reading timing for memory (A) 124a and memory (B) 124b, as well as shutter signals SH for switching one line of scanning. In the present example, the memory 124a is subjected each time to resetting of address made by each odd-numbered shutter signals SH, and stores image data A/D-converted in succession according to clock signals $\phi$ from address "0". Namely, it functions so that it stores an odd-numbered line temporarily. The memory (B) 124b, on the other hand, is subjected each time to resetting of address made by each even-numbered shutter signals SH, and stores image data A/D-converted in succession according to clock signals $\phi$ from address "0". Namely, it functions so that it stores an even-numbered line temporarily. Image data equivalent to a few lines are integrated are stored in memory (C) 126. The control of address and clock of memory (A) 124a and memory (B) 124b are conducted through memory controller 140.

Figure 16:
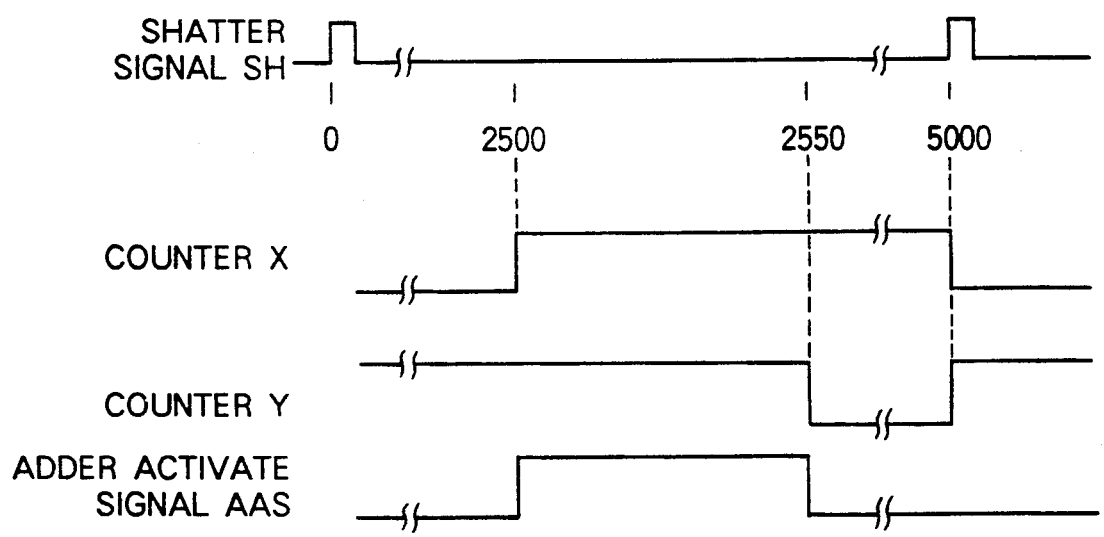
FIG. 16 shows a counter (X) and a timing chart (Y) both used for the document size detection apparatus shown in FIG. 15.

On the other hand, counter (X) 127a shows "L" with shutter signals SH as shown in FIG. 16, and it counts clock signals $\phi$, and when the counted value reaches "2500", for example, it shows "H". The counter (Y) 127b, on the other hand, shows "H" with shutter signals SH, and it counts clock signals $\phi$, and when the counted value reaches "2550", it shows "L". Therefore, when output of counter (X) 127a and that of counter (Y) 127b are sent to AND circuit 128, adder active signals AAS shown in FIG. 16 are obtained.

Adder 129, while it contains adder active signals AAS, adds up image data in one line by means of register 130. Data of the register 130 are stored in memory (D) 131 by CPU 1,2 for every shutter signal SH. Immediately after completion of the aforementioned operation, the register 130 is cleared by CPU. With adder active signals ASS generated in succession thereafter, the adder 129 adds up image data in the register 130 again, and CPU 132 stores them in the address next to the previous data in memory (D) 131 according to shutter signals, and clears the register 130. To be concrete, in the memory 131, data added in the main scanning direction, namely, the integrated data are placed in the sequence of address in the auxiliary scanning direction.

The CPU 132 integrates the aforementioned image data according to the program stored in memory 133, using clock signals $\phi$ generated from timing signal generation circuit 125 and shutter signals SH. Memory 134 stores, for the purpose of detecting the document size, the variation ratios obtained through differential processing of integrated image data described later.

Figure 19:
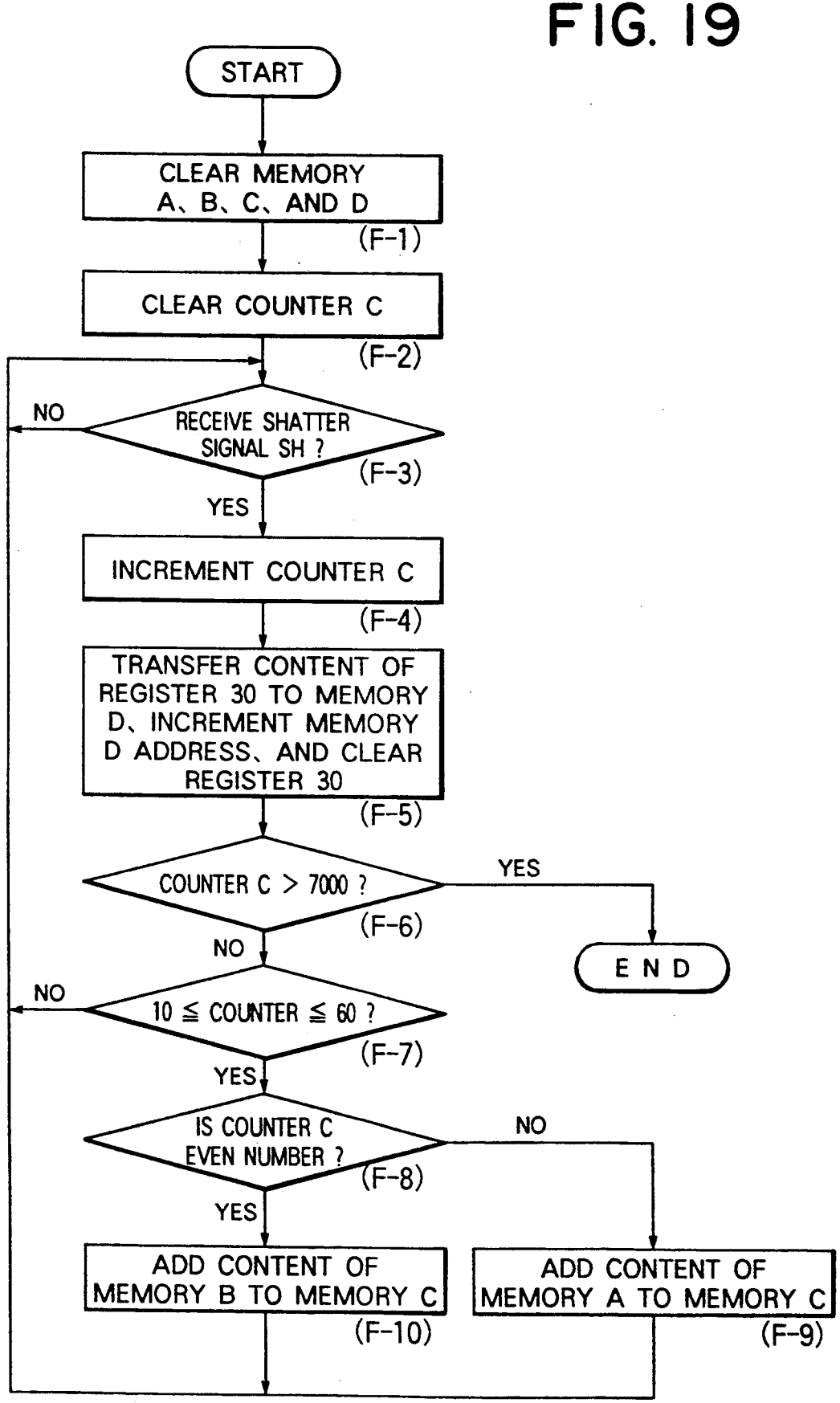
FIG. 19 is a flow chart illustrating movements for integrating the image data.

Before explaining integration movements for preparing data for the detection of the document size referring to FIG. 19, the principle of detection of the document size in the present invention will be explained referring to FIG. 17.

When document G placed on document table 1 as shown in FIG. 17 is scanned, signals shown in FIG. 18-A are obtained as image signals for one line. When such image signals are integrated for some lines (50 lines in the present example), signal component (so-called noise component) N for toner soil on peripheral areas of a document is much smaller than the signal component for shadows around the document and for information on the document to be negligible, thus, image data shown in FIG. 18-B are obtained. When such image signals are subjected to differential calculation and thereby the variation ratios of the signals are obtained, the portion of the shadow is surely detected, resulting in easy detection of the width of the document.

In the same concept, image data integrated for the specific pixel portion in one line (from the pixel number of "2500" to that of "2550" in the present example) are used as image data for the detectin of the length of the document.

In both cases, when the image data thus obtained are subjected to differential calculation and thereby the variation ratio is obtained, the variation ratio at the side edge of the document shows a large value. Therefore, it is possible to detect the width W of the document G by obtaining the position of the variation point.

In the explanation below, the document information is to be read with resolution of 16 dots/mm. When a document is placed on document table 1 so that the leading edge of the document G may touch document stopper plate 1a as shown in FIG. 17, the pixel number of the leftmost position in the main scanning direction on the document glass surface reading area is designated as "0" and the that of the rightmost position is designated as "5000", while, the scanning line number of the front row in the auxiliary scanning direction is designated as "1" and that of the lowermost position on the document glass surface reading area is designated as "7000". Further, 50 scanning lines used for detecting the width W of the document are assumed to be from the 10th line to the 60th line.

Since the standard position (home position) of units A and B of optical scanning system 4 is close the document stopper plate 1a on the apparatus main body 100, when a recording button is pressed and exposure lamp 4a is lit, the reflected light from white standard plate 3 is received by CCD 4f, and image data outputted from A/D converter 122 are stored in memory 123a of shading compensation circuit 123 to be used as shading compensation data on the occasion of image reading operation.

Integration operation movement as a preliminary step for detection of the document size will be explained as follows,, referring to FIG. 19.

The movement is started by pressing a recording button.

First, memories (A), (B) (C) and (D) are cleared (F-1), and then counter C built in CPU 132 is cleared (F-2). Arrival of shutter signals SH is waited and when they arrive (F-3), the number of scanning cycles is stored by means of increment of counter C (F-4).

In scanning for one line, on the other hand, when the pixel number reaches "2500", adder active signals AAS are outputted, and therefore, adder 129 takes in image data and transfers them to register (T) 130 and it further transfers them to memory 131 based on the command of CPU 132. In this case, increment of address of memory (D) 131 is conducted and register (T) 130 is cleared. The aforementioned operation is repeated for each scanning in the scannable area (the number of scanning lines for the greatest scanning area is assumed to be, for example, 7000) (F-6), and data for the portion from the pixel number of "2500" to that of "2550" among image data obtained from the result of scanning for each line are integrated in memory (D) 131.

When the number of scanning is superposed and counter C reaches 10, namely, in the case of the 10th scanning (F-7, F-8), image data for one line stored in memory (B) 124b are transferred to memory (C) 126 (F-9), and in the 11th scanning, image data for one line stored in memory (A) 124a are transferred to memory (C) 126 and the image data are added to image data for the 10th line which are already stored (F-10). The operation for adding to memory (C) 126 is repeated up to the 60th scanning.

On the other hand, the operation for integrating to memory (D) 131 is repeated as long as adder active signal ASS is generated, namely, it is repeated within the greatest scanning area (corresponding to 7000 in terms of counted value of counter C) (F-6).

When scanning for the entire document glass surface reading area is completed, image data from the 10th line to the 60th line are integrated and stored in memory (C) 126, and image data for the portion from the pixel number of "2500" to that of "2550" for all lines from the first line to the 7000th line are integrated and stored in memory (D) 131.

Next, the operation for detecting the width and the length of the document by the use of integrated image data obtained through the above steps will be explained, referring to flow charts in FIGS. 20 and 21. Both of them are to follow the flow chart of integration operation shown FIG. 19.

First, the operation for detecting the width of the document will be explained as follows, referring to FIG. 20.

Integrated values stored in memory (C) 126 are read (W-1), and are subjected to differential calculation (W-2). Variation ratios obtained from the differential calculation are stored in memory (E) 134 (W-3). Then, the pixel numbers are counted in succession from the scanning start location, namely, from the pixel having the pixel number of "0" (W-4), and the variation ratios stored in memory (E) 134 are read in succession from the pixel number of "0" (W-5). Then, the read variation ratio is examined whether it is not lower than the threshold value or not (W-6), and if it is not lower than the threshold value, the pixel number $a_1$ where the variation ratio first exceeds the threshold value is stored in register $R_1$ built in CPU 132 as position data of the variation point (W-7).

After that, the pixel numbers are counted successively from the scanning end location, namely from the pixel having the pixel number of "5000" (W-8), and the variation ratios stored in memory (E) 34 are read in succession from the pixel number of "5000" (W-9). Then, the read variation ratio is examined whether it is not lower than the threshold value or not (W-10), and if it is not lower than the threshold value, the pixel number $a_2$ where the threshold value first exceeds the threshold value is stored in register $R_2$ of CPU 132 as position data of the variation point (W-11).

The pixel numbers $a_1$ and $a_2$ which are obtained in the above steps as position data are used in the expression below for calculation of the width W of the document G (W-12).

$$\text{Width of document W (mm)} = 1/16 \{5000 - (a_1 + a_2)\}$$

Data of the width W of the document thus obtained are stored in register $R_3$ built in CPU 32 (W-13).

Next, the operation for detecting the length of the document will be explained as follows, referring to FIG. 21.

The integrated values stored in memory (D) 131 are read (L-1), and they are subjected to differential calculation (L-2). The variation ratios obtained from the differential calculation are stored in memory (E) 134 (L-3). Then, the numbers of lines are counted from the last scanning line, namely from the line having the scanning number of "7000" (L-4), and the variation ratios stored in memory (E) 134 are read and compared with the threshold value (L-5). After the comparison, when the variation ratio exceeds the threshold value (L-6), the number of line $b_1$ where the variation value first exceeds the threshold value is stored in register $R_1$ built in CPU 132 as the position data of the variation point (L-7).

The number of scanning line $b_1$ representing the position data of the variation point thus obtained is used in the following expression for calculating the length of the document G.

$$\text{Length of document L (mm)} = 1/16 \, (7000 - b_1)$$

The data of the length L thus obtained are stored in register $R_4$ built in CPU 132 (L-9).

Figure 22:
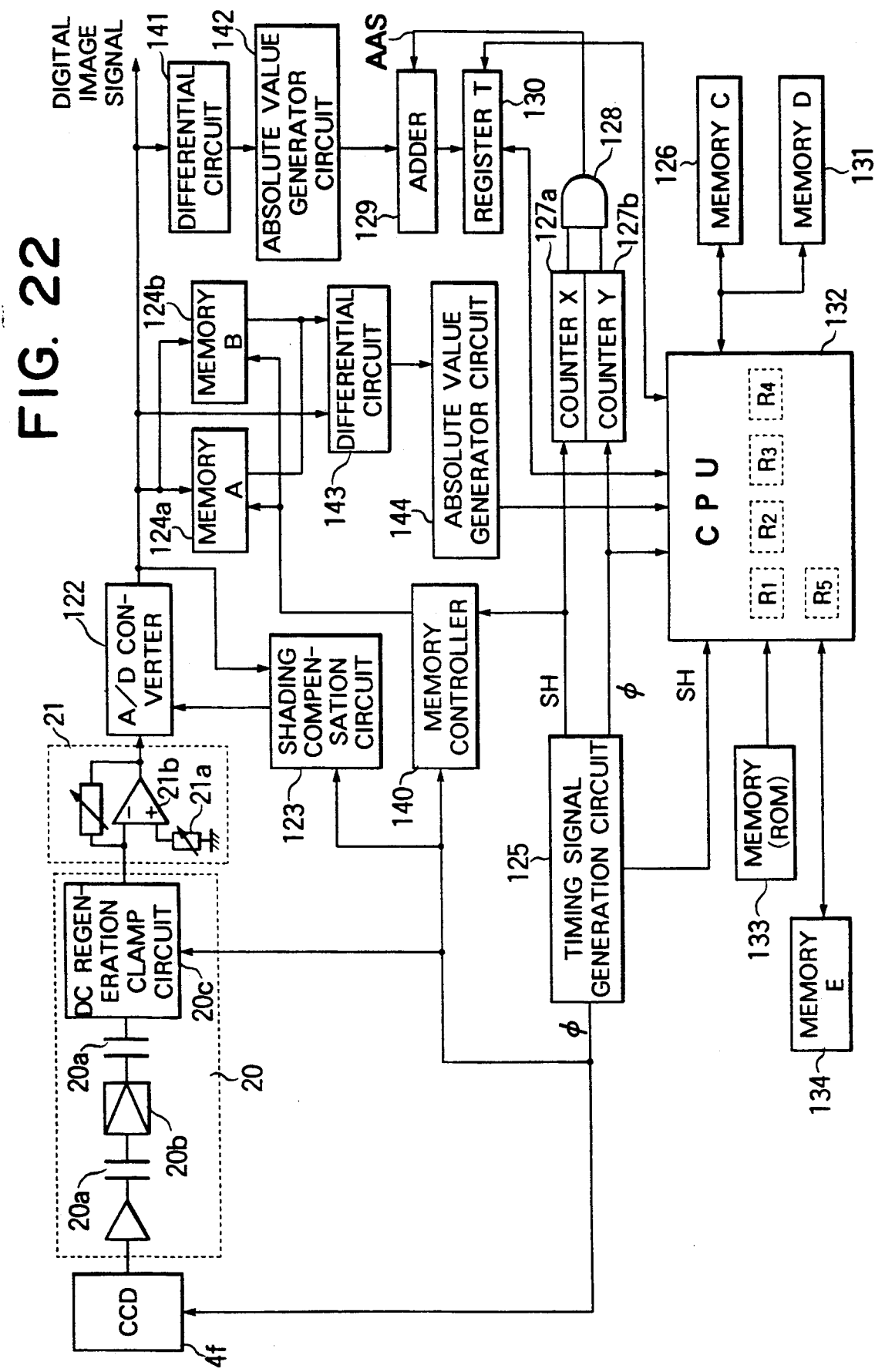
FIG. 22 is a block diagram of another example of the document size detection apparatus of the invention.

FIG. 22 is a block diagram of another example of the document size detection apparatus related to the invention.

In the example described previously, image signals are integrated in the main scanning direction first, and then in the auxiliary scanning direction, and after that, the variation ratios of the integrated image signals are calculated. In the present example, however, the variation ratios of the image signals both in the main scanning direction and the auxiliary scanning direction are calculated, then, absolute values of the variation ratios are calculated, and the calculated absolute values of the variation ratios are integrated both in the main scanning direction and the auxiliary scanning direction.

Since the circuit structure of the present example is basically similar to that of the example shown in FIG. 15, the different points only will be explained as follows.

The present example is additionally provided with differential circuit 141 that calculates the variation ratio of image signals in the main scanning direction, absolute value generator circuit 142 that calculates the absolute value of the variation ratio calculated by the differential circuit 141, differential circuit 143 that calculates the variation ratio of image signals in the auxiliary scanning direction and absolute value generator circuit 144 that calculates the absolute value of the variation ratio calculated by the differential circuit 143.

In the differential circuit 141, the variation ratio of image data is obtained by calculating the difference of image data between adjoining pixels in the range of relevant pixels (from pixel signal of "2500" to that of "2550"), then, that difference of the pixel data, namely the variation ratio is subjected to absolute value generation in the absolute value generator circuit 142, and are stored in register (T) 130 through adder 129 as positive data. For example, the variation ratio can be obtained by the following expression under the condition that the image data having the image signal of "2500" is $d_1$, and the image data having the image signal of "2501" and adjoining the aforementioned image data is $d_2$.

$$(d_2-d_1)/(2501-2500)=d_2-d_1$$

The variation ratio $(d_2-d_1)$ thus obtained is converted to the positive signal through the absolute value generator circuit 142 and is stored in the register (T) 130. The same differential calculation are conducted for the pixel range from the pixel number of "2500" to that of "2550", and variation ratios thus obtained are added in the adder 129 to be stored in the register (T) 130. The added value, namely the integrated value of the variation ratios obtained for each scanning line is caused by the command of CPU 132 to be stored in memory (D) 131.

In the differential circuit 143, on the other hand, the variation ratio in the auxiliary scanning direction is obtained by calculating the difference between the current image data outputted from A/D converter 122 and the image data before one scanning read from memory (A) 124a or memory (B) 124b, and the variation ratios thus obtained are subjected to absolute value generation in absolute value generator circuit 144, and then are stored in memory (C) 126 as positive data. The same differential calculation is conducted for each pair of adjoining scanning lines in the range from the 10th scanning line to the 60th scanning line, and variation ratios thus obtained are integrated and stored in the memory (C) 126 so that they may correspond to relevant pixel numbers respectively.

Figure 20:
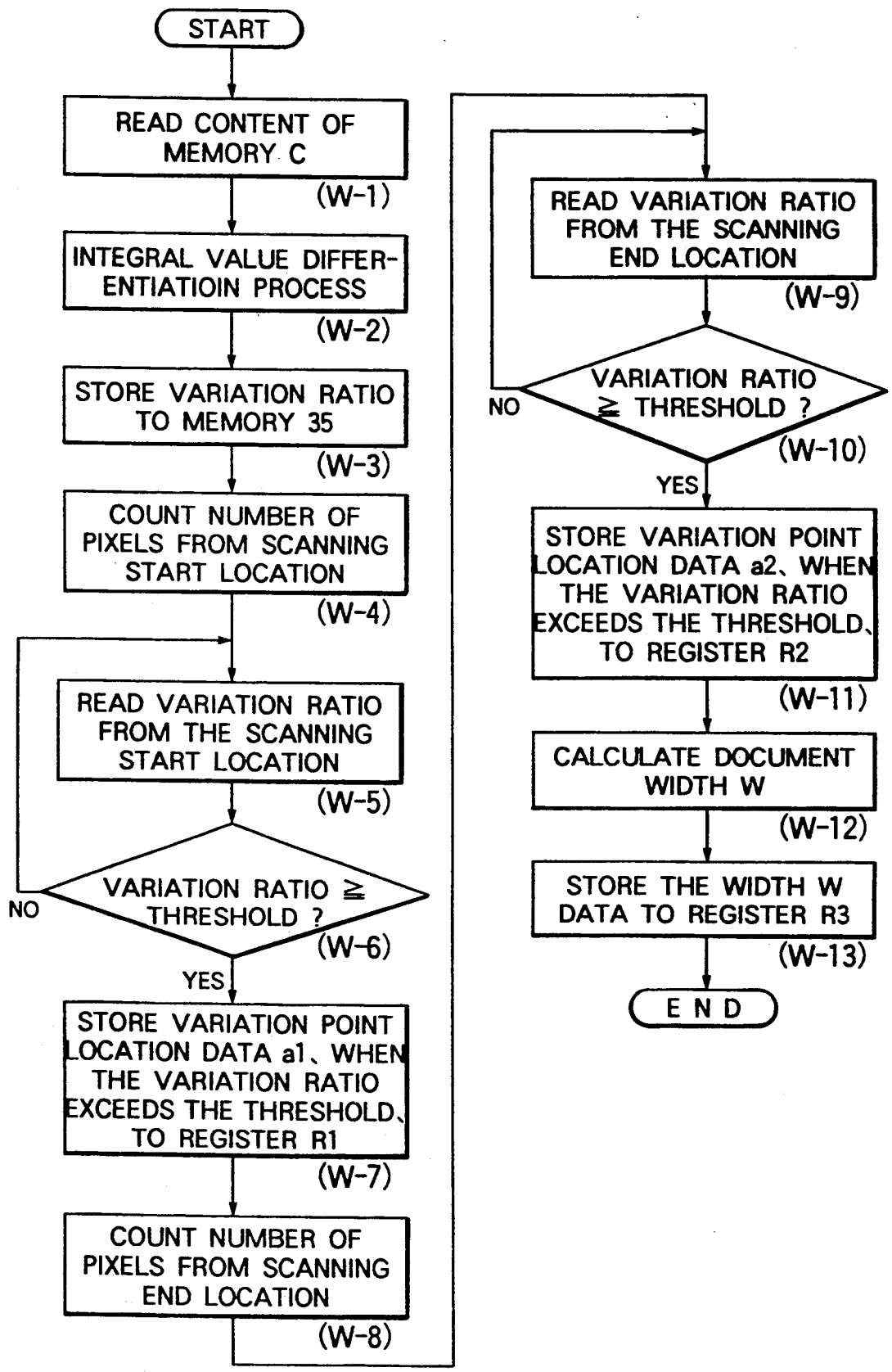
FIG. 20 is a flow chart of movements for detecting the width of the document.
Figure 21:
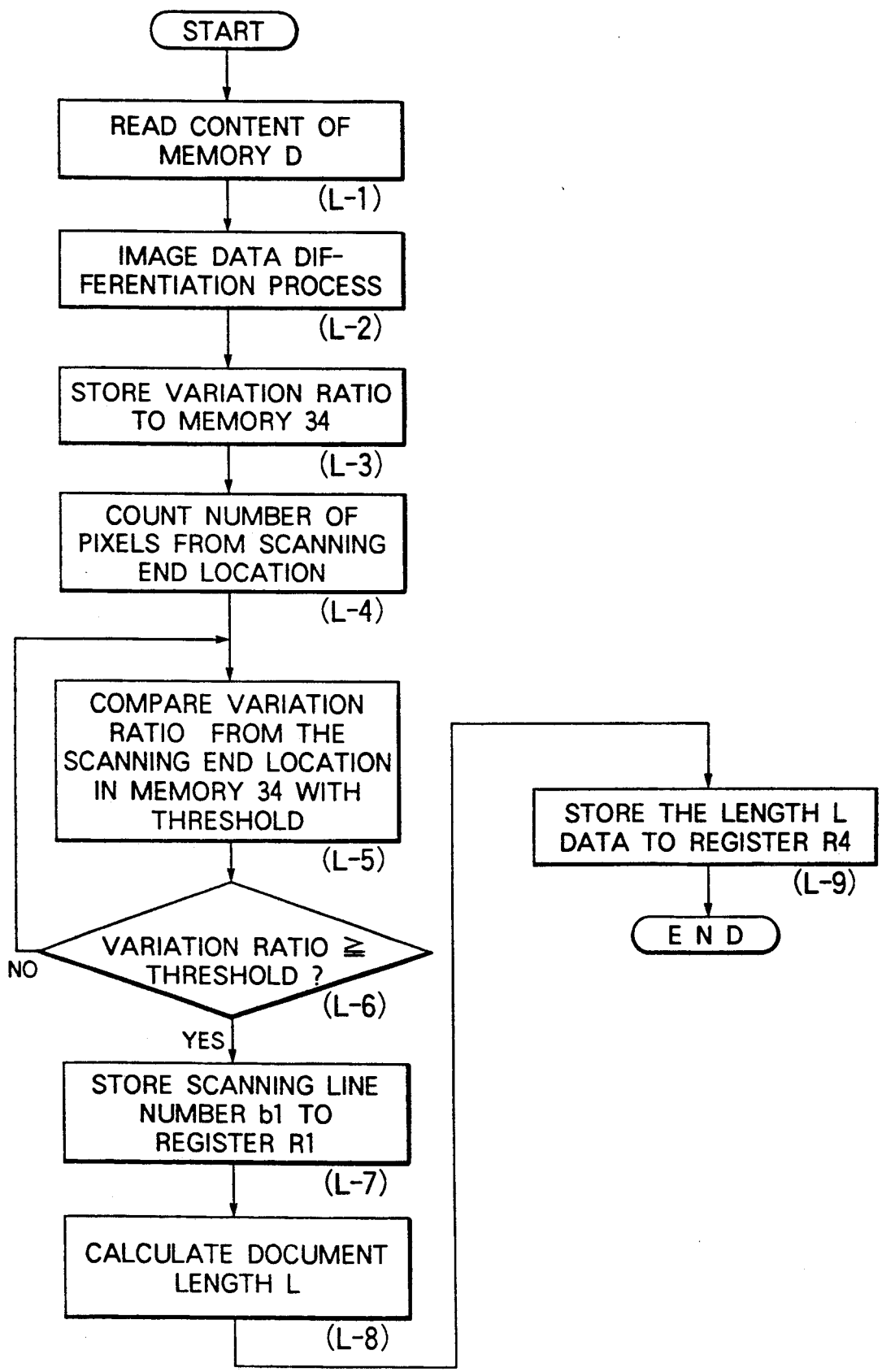
FIG. 21 is a flow chart of movements for detecting the length of the document.

The operation for detecting the width and the length of the document G by using the variation ratio data thus integrated and stored in the memory (C) 126 and the memory (D) 131 is almost the same as that in the example explained referring to FIGS. 20 and 21.

Figure 23:
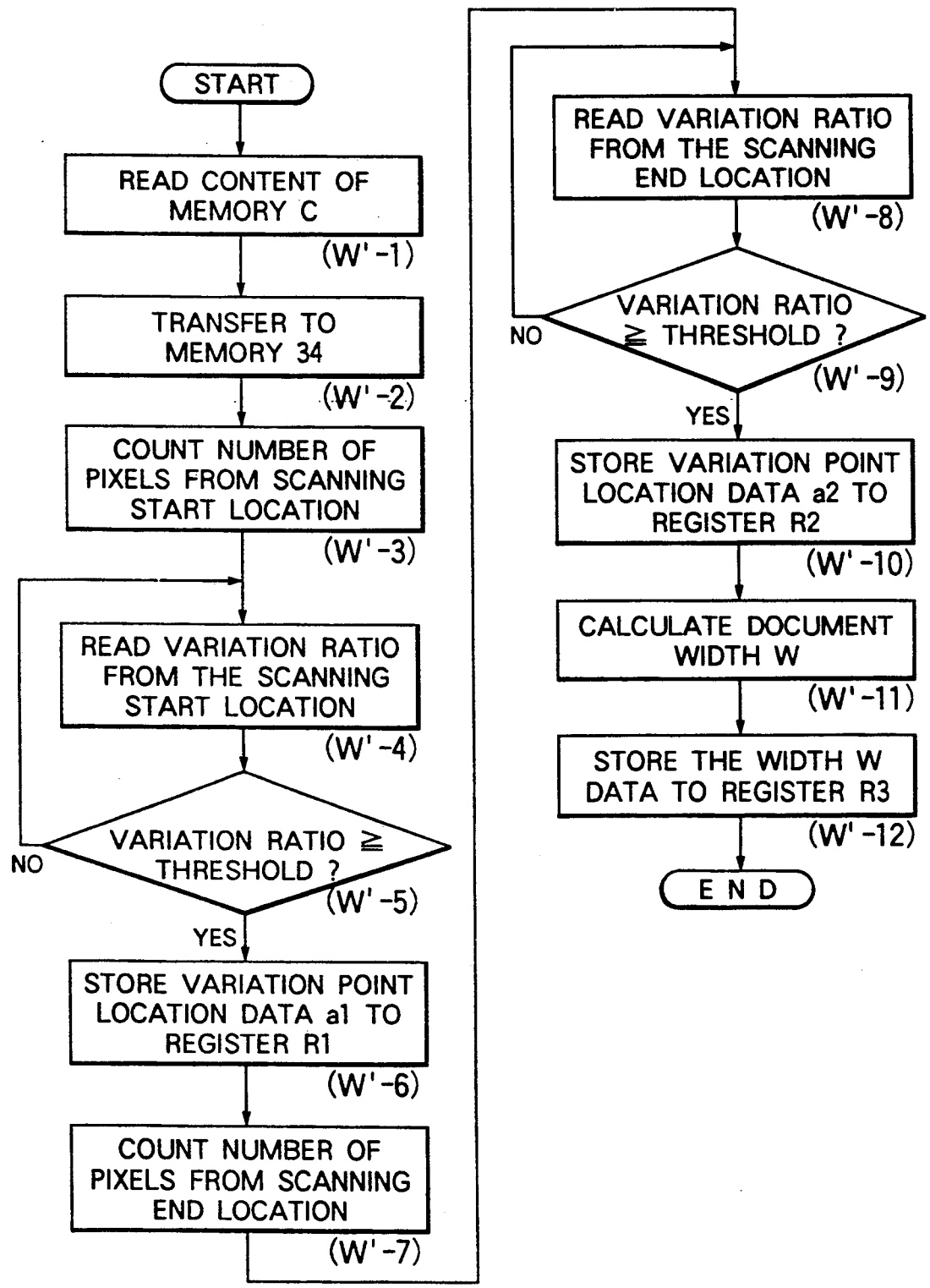
FIG. 23 is a flow chart of movements for detecting the width of the documents.

FIG. 23 is a flow chart of an operation for detecting the width W of the document G.

The operations (W'-3 through W'-12) after reading (W'-1) the variation ratio data in the main scanning direction stored in the memory (C) 126 and transferring them to memory (E) 134 are the same as those shown in FIG. 20.

Figure 24:
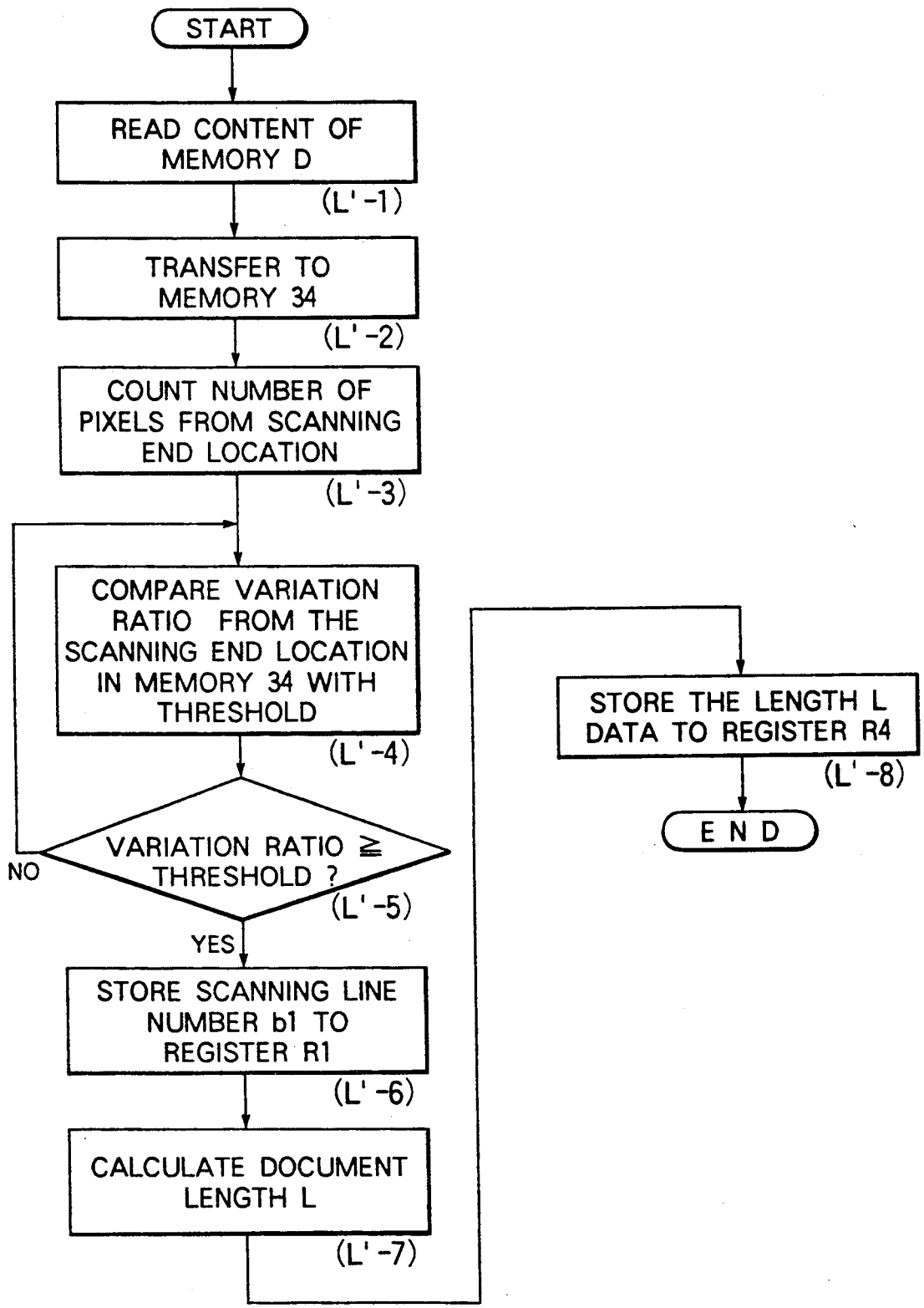
FIG. 24 is a flow chart of movements for detecting the length of the document.

FIG. 24 is a flow chart of the operation for detecting the length of the document G.

In this case again, the operations (L'-3 through L'-8) after reading (L'-1) the variation ratio data in the auxiliary scanning direction stored in the memory (D) 131 and transferring (L'-2) them to the memory (E) 134 are the same as those shown in FIG. 21 explained referring thereto.

In the invention, as stated above, the document size can be detected by detecting positions both in the main scanning direction and the auxiliary scanning direction of the shadow of the document edge which is casted on a platen cover due to the thickness of the document when the document is irradiated. Therefore, it is possible to record document information only even when the document is a transparent document to be used for OHP or a thin document, In addition to that, even when recording on the recording sheet which is larger than the document, neither excessive colors and patterns nor black streaks are produced on the area surrounding the document information area, and signal processing circuits for eliminating such unnecessary shadows and streaks are not needed at all.

Further, even when a platen cover is lifted slightly, or even when the platen cover is completely opened in case of recording, the document size can be detected due to the invention.

In addition, even in the case of an image recording apparatus employing an automatic document feeding system (ADF), the document size can be detected.

Furthermore, for detecting the document size by detecting the positions in the main scanning direction and in the auxiliary scanning direction of shadows of the document edges which are casted on a platen cover due to the thickness of the document when the document is irradiated, image signals in time series in each scanning direction are integrated, and the integrated values are differentiated, or the absolute values of the variation ratios of image signals are differentiated. Therefore, noise components due to contamination caused by copying on the peripheral area of the document are eliminated, and thereby the S/N ratio is improved, thus, the document size can surely be detected.

What is claimed is:

1. A document size detection apparatus for detecting a size of a document provided on document scanning apparatus, comprising:

irradiating means for irradiating said document with a light beam in a primary irradiating direction and in an auxiliary irradiating direction;

covering means for covering said document;

receiving means for receiving a reflection of said light beam reflected from said document and said covering means;

conversion means for converting said reflection to image signals;

detecting means for detecting in said image signals, a shadow cast by said document onto said covering means when the document was irradiated by said light beam of said irradiating means;

determining means for determining said size of said document from said detected shadow of said document;

said detecting means including calculating means for calculating a plurality of variation ratios of said image signals, each variation ratio being represented by the equation $$\frac{(d_2 - d_1)}{(\text{location value of } d_2 - \text{location value of } d_1)} = d_2 - d_1$$

where $d_1$ represents an image signal value at a location $d_1$, and $d_2$ represents an image signal value at a location $d_2$, and wherein the locations of $d_2$ and $d_1$ are a predetermined number of positions apart and wherein the location value of $d_2-d_1$ in the denominator of said equation equals one;

ascertaining means for ascertaining a first location where at least one of said plurality of variation ratios exceeds a first predetermined value at an outermost side of said document in said primary irradiating direction, and for ascertaining a second location where at least one of said plurality of variation ratios exceeds a second predetermined value at an outermost side of said document in said auxiliary irradiating direction;

changing means for changing said first predetermined value and said second predetermined value; and wherein said determining means determines said size of said document based upon the ascertained first and second locations.

2. The apparatus of claim 1, further comprising:

storing means for storing a probability distribution function wherein a largest value of the probability distribution function corresponds to a side edge of said document;

means for multiplying at least two of said plurality of variation ratios by said probability distribution function so that a plurality of multiplied values are obtained;

said ascertaining means ascertaining the first and second locations from said plurality of multiplied values.

3. The apparatus of claim 2, further comprising:

integration means for integrating said image signals in said primary irradiating direction and in said auxiliary irradiating direction for providing a plurality of integrated image signals; and wherein said calculating means calculates a plurality of variation ratios of said integrated image signals.

4. The apparatus of claim 1, further comprising:

means for obtaining a plurality of absolute values of said plurality of variation ratios;

means for integrating said absolute values in said primary irradiating direction and in said auxiliary irradiating direction so that a plurality of integrated absolute values are obtained; and said ascertaining means ascertaining a first location where at least one of said plurality of integrated absolute values exceeds a first predetermined value at an outermost side of said document in said primary irradiating direction, and ascertaining a second location where at least one of said plurality of integrated absolute values exceeds a second predetermined value at an outermost side of said document in said auxiliary irradiating direction.

5. A document size detection apparatus for detecting a size of a document provided on document scanning apparatus, comprising:

irradiating means for irradiating said document with a light beam in a primary irradiating direction and in an auxiliary irradiating direction;

covering means for covering said document;

receiving means for receiving a reflection of said light beam reflected from said document and said covering means;

conversion means for converting said reflection to image signals;

detecting means for detecting in said image signals, a shadow cast by said document onto said covering means when the document was irradiated by said light beam of said irradiating means;

determining means for determining said size of said document from said detected shadow of said document;

said detecting means including calculating means for calculating a plurality of variation ratios of said image signals, each variation ratio being represented by the equation $$\frac{(d_2 - d_1)}{(\text{location value of } d_2 - \text{location value of } d_1)} = d_2 - d_1$$

where $d_1$ represents an image signal value at a location $d_1$, and $d_2$ represents an image signal value at a location $d_2$, and wherein the locations of $d_2$ and $d_1$ are a predetermined number of positions apart and wherein the location value of $d_2 - d_1$ in the denominator of said equation equals one;

storing means for storing a probability distribution function wherein a largest value of said probability distribution function corresponds to a side edge of said document;

means for multiplying at least two of said plurality of variation ratios by said probability distribution function so that a plurality of multiplied values are obtained; and means for ascertaining a first location where at least one of said plurality of multiplied values exceeds a first predetermined value at an outermost side of said document in said primary irradiating direction, and for ascertaining a second location where at least one of said plurality of multiplied values exceeds a second predetermined value at an outermost side of said document in said auxiliary irradiating direction;

wherein said determining means determines said size of said document based upon the ascertained first and second locations.

6. The apparatus of claim 5, further comprising integration means for integrating said image signals in said primary irradiating direction and in said auxiliary irradiating direction for providing a plurality of integrated image signals; and wherein said calculating means calculates a plurality of variation ratios of said integrated image signals.

7. The apparatus of claim 5, further comprising means for obtaining a plurality of absolute values of said plurality of variation ratios;

means for integrating said absolute values in said primary irradiating direction and in said auxiliary irradiating direction so that a plurality of integrated absolute values are obtained; and said ascertaining means ascertaining a first location where at least one of said plurality of integrated absolute values exceeds a first predetermined value at an outermost side of said document in said primary irradiating direction, and ascertaining a second location where at least one of said plurality of integrated absolute values exceeds a second predetermined value at an outermost side of said document in said auxiliary irradiating direction.

8. A document size detection apparatus for detecting a size of a document provided on document scanning apparatus, comprising irradiating means for irradiating said document with a light beam in a primary irradiating direction and in an auxiliary irradiating direction;

covering means for covering said document;

receiving means for receiving a reflection of said light beam reflected from said document and said covering means;

conversion means for converting said reflection to image signals;

detecting means for detecting in said image signals, a shadow cast by said document onto said covering means when the document was irradiated by said light beam of said irradiating means;

determining means for determining said size of said document from said detected shadow of said document included in said image signals;

said detecting means including calculating means for calculating a plurality of variation ratios of said image signals, each variation ratio being represented by the equation $$\frac{(d_2 - d_1)}{(\text{location value of } d_2 - \text{location value of } d_1)} = d_2 - d_1$$

where $d_1$ represents an image signal value at a location $d_1$, and $d_2$ represents an image signal value at a location $d_2$, and wherein the locations of $d_2$ and $d_1$ are a predetermined number of positions apart and wherein the location value of $d_2 - d_1$ in the denominator of said equation equals one;

ascertaining means for ascertaining a first location where at least one of said plurality of variation ratios exceeds a first predetermined value at an outermost side of said document in said primary irradiating direction, and for ascertaining a second location where at least one of said plurality of variation ratios exceeds a second predetermined value at an outermost side of said document in said auxiliary irradiating direction;

integration means for integrating said image signals in said primary irradiating direction and in said auxiliary irradiating direction for providing a plurality of integrated image signals; and wherein said calculating means calculates a plurality of variation ratios of said integrated image signals.

9. The apparatus of claim 8, further comprising:

means for obtaining a plurality of absolute values of said plurality of variation ratios;

means for integrating said absolute values in said primary irradiating direction and in said auxiliary irradiating direction so that a plurality of integrated absolute values are obtained; and said ascertainirg means ascertaining a first location where at least one of said plurality of integrated absolute values exceeds a first predetermined value at an outermost side of said document in said primary irradiating direction, and ascertaining a second location where at least one of said plurality of integrated absolute values exceeds a second predetermined value at an outermost side of said document in said auxiliary irradiating direction.

10. A document size detection apparatus for detecting a size of a document provided on document scanning apparatus, comprising:

irradiating means for irradiating said document with a light beam in a primary irradiating direction and in an auxiliary irradiating direction;

covering means for covering said document;

receiving means for receiving a reflection of said light beam reflected from said document and said covering means;

conversion means for converting said reflection to image signals;

detecting means for detecting in said image signal, a shadow cast by said document onto said covering means when the document was irradiated by said light beam of said irradiating means;

determining means for determining said size of said document from said detected shadow of said document included in said image signals;

said detecting means including calculating means for calculating a plurality of variation ratios of said image signals, each variation ratio being represented by the equation $$\frac{(d_2 - d_1)}{(\text{location value of } d_2 - \text{location value of } d_1)} = d_2 - d_1$$

where $d_1$ represents an image signal value at a location $d_1$, and $d_2$ represents an image signal value at a location $d_2$, and wherein the locations of $d_2$ and $d_1$ are a predetermined number of positions apart, and wherein the location value of $d_2 - d_1$ in the denominator of said equation equals one;

ascertaining means for ascertaining a first location where at least one of said plurality of variation ratios exceeds a first predetermined value at an outermost side of said document in said primary irradiating direction, and for ascertaining a second location where at least one of said plurality of variation ratios exceeds a second predetermined value at an outermost side of said document in said auxiliary irradiating direction;

means for obtaining a plurality of absolute values of said plurality of variation ratios; means for integrating said absolute values in said primary irradiating direction and in said auxiliary irradiating direction so that a plurality of integrated absolute values are obtained; and said ascertaining means ascertaining a first location where at least one of said plurality of integrated absolute values exceeds a first predetermined value at an outermost side of said document in said primary irradiating direction, and ascertaining a second location where at least one of said plurality of integrated absolute values exceeds a second predetermined value at an outermost side of said document in said auxiliary irradiating direction.

* * * * *